(12) United States Patent
Dykstra et al.

(10) Patent No.: US 10,794,168 B2
(45) Date of Patent: Oct. 6, 2020

(54) CONTROLLING WELLBORE OPERATIONS

(71) Applicant: Halliburton Energy Services, Inc., Houston, TX (US)

(72) Inventors: Jason D. Dykstra, Carrollton, TX (US); Zhijie Sun, Plano, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/035,693

(22) PCT Filed: Dec. 6, 2013

(86) PCT No.: PCT/US2013/073661
§ 371 (c)(1),
(2) Date: May 10, 2016

(87) PCT Pub. No.: WO2015/084401
PCT Pub. Date: Jun. 11, 2015

(65) Prior Publication Data
US 2016/0265334 A1    Sep. 15, 2016

(51) Int. Cl.
*E21B 44/00*    (2006.01)
*E21B 41/00*    (2006.01)
(Continued)

(52) U.S. Cl.
CPC .............. *E21B 44/00* (2013.01); *E21B 7/04* (2013.01); *E21B 41/0092* (2013.01);
(Continued)

(58) Field of Classification Search
CPC ........ E21B 3/00; E21B 41/0092; E21B 44/00; E21B 44/02; E21B 47/00; E21B 47/022;
(Continued)

(56) References Cited

U.S. PATENT DOCUMENTS 5,155,916 A * 10/1992 Engebretson ......... E21B 47/022
33/302
5,341,886 A *  8/1994 Patton ...................... E21B 7/04
175/24
(Continued)

FOREIGN PATENT DOCUMENTS

CN          1910589 A       2/2007
WO     WO2010059295 A1    5/2010

OTHER PUBLICATIONS

Bemporad et al, "Model Predictive Control—New tools for design and evaluation", Jul. 2004, pp. 5622-5627. (Year: 2004).*
(Continued)

*Primary Examiner* — Rocio Del Mar Perez-Velez
*Assistant Examiner* — Olvin Lopez Alvarez
(74) *Attorney, Agent, or Firm* — Jason Sedano; Parker Justiss, P.C.

(57) ABSTRACT

Techniques for controlling a bottom hole assembly (BHA) to follow a planned wellbore path include determining sensor measurements from the BHA; determining a model of BHA dynamics based on the sensor measurements from the BHA; determining a weighting factor that corresponds to a drilling objective; determining an objective function comprising the drilling objective, weighted by the weighting factor, and one or more constraints; determining a control input to the BHA that satisfies the objective function and the one or more constraints; and applying the control input to the BHA.

24 Claims, 10 Drawing Sheets

(51) Int. Cl.
    *E21B 47/022* (2012.01)
    *E21B 47/024* (2006.01)
    *G01V 11/00* (2006.01)
    *G05B 19/406* (2006.01)
    *E21B 44/02* (2006.01)
    *E21B 47/00* (2012.01)
    *E21B 7/04* (2006.01)
    *E21B 3/00* (2006.01)

(52) U.S. Cl.
    CPC .............. *E21B 44/02* (2013.01); *E21B 47/00* (2013.01); *E21B 47/022* (2013.01); *E21B 47/024* (2013.01); *G01V 11/002* (2013.01); *G05B 19/406* (2013.01); *E21B 3/00* (2013.01); *G05B 2219/45129* (2013.01)

(58) Field of Classification Search
    CPC ....... E21B 47/024; E21B 7/04; G01V 11/002; G05B 19/406; G05B 2219/45129
    See application file for complete search history.

(56) References Cited

U.S. PATENT DOCUMENTS

| | | | |
|---|---|---|---|
| 5,561,598 A | 10/1996 | Nowak et al. | |
| 6,317,416 B1 | 11/2001 | Giroux et al. | |
| 6,438,495 B1* | 8/2002 | Chau ........................ | E21B 7/04 702/9 |
| 6,732,052 B2* | 5/2004 | MacDonald .......... | E21B 44/005 175/24 |
| 7,003,439 B2* | 2/2006 | Aldred .................... | E21B 44/00 175/45 |
| 7,023,866 B2 | 4/2006 | Giroux et al. | |
| 7,054,750 B2* | 5/2006 | Rodney .................... | E21B 7/04 702/9 |
| 7,172,037 B2 | 2/2007 | Dashevskiy et al. | |
| 8,185,217 B2 | 5/2012 | Thiele | |
| 8,210,283 B1* | 7/2012 | Benson .................... | E21B 7/04 175/61 |
| 8,214,188 B2 | 7/2012 | Bailey et al. | |
| 8,256,534 B2 | 9/2012 | Byreddy et al. | |
| 8,527,248 B2 | 9/2013 | Thambynayagam et al. | |
| 8,892,407 B2* | 11/2014 | Budiman ................ | E21B 47/04 703/10 |
| 8,931,580 B2* | 1/2015 | Cheng .................... | E21B 43/30 175/45 |
| 8,996,396 B2* | 3/2015 | Benson ............ | G06Q 10/06313 705/7.35 |
| 9,134,452 B2* | 9/2015 | Bowler ................ | G01V 11/00 |
| 9,428,961 B2* | 8/2016 | Benson .................... | E21B 7/06 |
| 10,012,025 B2* | 7/2018 | Spencer .................. | E21B 44/00 |
| 2002/0133958 A1* | 9/2002 | Noureldin ................ | E21B 47/022 33/304 |
| 2003/0121657 A1* | 7/2003 | Chia ...................... | E21B 47/022 166/255.2 |
| 2004/0004135 A1* | 1/2004 | Hamamatsu ........... | B63H 25/42 239/265.19 |
| 2004/0230413 A1* | 11/2004 | Chen ...................... | E21B 10/08 703/10 |
| 2005/0209713 A1* | 9/2005 | Fuller .................. | G05B 13/048 700/29 |
| 2007/0021857 A1* | 1/2007 | Huang .................... | E21B 10/00 700/117 |
| 2007/0276512 A1* | 11/2007 | Fan ........................ | G05B 11/32 700/37 |
| 2008/0314641 A1* | 12/2008 | McClard .................. | E21B 7/04 175/57 |
| 2009/0030858 A1* | 1/2009 | Hegeman ................ | E21B 49/10 706/17 |
| 2009/0067651 A1 | 3/2009 | Klinkby et al. | |
| 2009/0198350 A1* | 8/2009 | Thiele .................. | G05B 13/042 700/30 |
| 2010/0096186 A1* | 4/2010 | Ekseth .................... | E21B 7/067 175/45 |
| 2010/0108384 A1* | 5/2010 | Byreddy ................ | E21B 44/00 175/27 |
| 2010/0185395 A1* | 7/2010 | Pirovolou ................ | E21B 7/04 702/9 |
| 2010/0191516 A1 | 7/2010 | Benish et al. | |
| 2010/0271232 A1* | 10/2010 | Clark ................ | E21B 47/02216 340/853.2 |
| 2010/0332139 A1* | 12/2010 | Bruun .................... | G01V 1/282 702/18 |
| 2011/0172976 A1* | 7/2011 | Budiman ................ | E21B 47/04 703/2 |
| 2012/0024606 A1* | 2/2012 | Pirovolou ................ | E21B 7/04 175/61 |
| 2012/0048618 A1* | 3/2012 | Zamanian .............. | E21B 47/024 175/24 |
| 2012/0179007 A1* | 7/2012 | Rinehart .............. | A61M 5/1723 600/301 |
| 2012/0247831 A1 | 10/2012 | Kaasa et al. | |
| 2012/0265367 A1 | 10/2012 | Yucelen et al. | |
| 2012/0276517 A1* | 11/2012 | Banaszuk .............. | G01C 21/00 434/365 |
| 2012/0292110 A1 | 11/2012 | Downtown | |
| 2012/0316787 A1* | 12/2012 | Moran .................... | E21B 44/00 702/9 |
| 2012/0330551 A1* | 12/2012 | Mitchell ................ | E21B 47/022 702/9 |
| 2013/0066471 A1* | 3/2013 | Wang ...................... | G05B 13/00 700/275 |
| 2013/0161096 A1* | 6/2013 | Benson .................... | E21B 7/04 175/26 |
| 2013/0272369 A1* | 10/2013 | Lutzky .................... | G10L 19/06 375/240 |
| 2013/0304235 A1* | 11/2013 | Ji .......................... | G05B 13/048 700/29 |
| 2014/0209300 A1* | 7/2014 | Tilke ........................ | E21B 47/00 166/250.01 |
| 2014/0277752 A1* | 9/2014 | Chang .................... | E21B 44/00 700/275 |
| 2014/0318866 A1* | 10/2014 | Lewis ................ | E21B 41/0092 175/40 |
| 2015/0226049 A1* | 8/2015 | Frangos ................ | E21B 44/00 702/6 |
| 2015/0309486 A1* | 10/2015 | Webersinke ......... | G05B 13/048 700/29 |
| 2015/0317585 A1* | 11/2015 | Panchal ................ | E21B 47/022 705/7.23 |
| 2015/0330155 A1* | 11/2015 | Logan .................. | E21B 17/003 166/380 |
| 2015/0330209 A1* | 11/2015 | Panchal .................... | E21B 7/04 700/275 |
| 2016/0047234 A1* | 2/2016 | Switzer .................... | H04J 9/00 340/854.6 |
| 2016/0145993 A1* | 5/2016 | Gillan .................... | E21B 23/14 175/24 |
| 2016/0194853 A1* | 7/2016 | Sawatsky ................ | E02F 9/024 172/799.5 |
| 2016/0281489 A1* | 9/2016 | Dykstra ................ | E21B 44/02 |
| 2016/0281490 A1* | 9/2016 | Samuel ................ | E21B 44/00 |
| 2016/0282513 A1* | 9/2016 | Holmes ................ | E21B 47/022 |
| 2016/0290113 A1* | 10/2016 | Kisra ...................... | E21B 47/00 |
| 2016/0290117 A1* | 10/2016 | Dykstra ................ | E21B 44/00 |
| 2017/0306702 A1* | 10/2017 | Summers ................ | E21B 44/02 |
| 2017/0350229 A1* | 12/2017 | Hoehn .................... | E21B 7/04 |
| 2018/0088552 A1* | 3/2018 | Dow ........................ | G01N 3/58 |
| 2018/0238133 A1* | 8/2018 | Fripp .................... | E21B 34/10 |
| 2019/0120994 A1* | 4/2019 | Servin .................... | G01V 3/30 |

OTHER PUBLICATIONS

Garriga et al, "Model Predictive Control Tuning Methods: A Review", Mar. 19, 2010, pp. 3505-3515. (Year: 2010).*
Short et al "A Microcontroller-Based Adaptive Model Predictive Control Platform for Process Control Applications", 2017, pp. 1-17. (Year: 2017).*
Odelson, "Estimating Disturbance Covariances From Data for Improved Control Performance", 2003, pp. 301 (Year: 2003).*

(56) References Cited

OTHER PUBLICATIONS

Wikipedia, "Model Predcitive Control" 2019, pp. 9 downloaded from the internet at https://en.wikipedia.org/wiki/Model_predictive_control. (Year: 2019).*

Lam et al, "Model Predictive Contouring Control", Dec. 15, 2010, pp. 6, downloaded from the internet https://people.eng.unimelb.edu.au/manziec/Publications%20pdfs/10_Conf_Lam.pdf (Year: 2010).*

Garriga et al, "Model Predictive Control Tuning Methods: A Review", 2010 pp. 3505-3515, downloaded from the internet https://pubs.acs.org/doi/pdf/10.1021/ie900323c (Year: 2010).*

Yutaka et al, "Model Predictive Control with Multi-objective Cost Function considering Stabilization and Linear Cost Optimization", 1997, pp. 547-552 downloaded from the internet https://www.sciencedirect.com/science/article/pii/S147466701743206X (Year: 1997).*

Hafez, et al., "Design of Neuro-fuzzy Controller Based on Dynamic Weights Updating," Lecture Notes in Computer Science, vol. 3356, 2004, pp. 58-67.

Campbell et al., "A Nonlinear Dynamic Inversion Predictor-Based Model," published in 2010, 6 pages.

PCT International Search Report and Written Opinion of the International Searching Authority, PCT/US2013/073661, dated Sep. 2, 2014, 12 pages.

Rowley et al., "Dynamic and Closed-Loop Control," Fundamentals and Applications of Modern Flow Control, vol. 231, Chapter 5, Progress in Astronautics and Aeronautics, AIAA, published in 2009, 40 pages.

\* cited by examiner

CONTROLLING WELLBORE OPERATIONS

CROSS-REFERENCE TO RELATED APPLICATIONS

This application is a U.S. National Phase Application under 35 U.S.C. § 371 and claims the benefit of priority to International Application Serial No. PCT/US2013/073661, filed on Dec. 6, 2013, the contents of which are hereby incorporated by reference.

TECHNICAL BACKGROUND

This disclosure relates to automated management of wellbore operation for the production of hydrocarbons from subsurface formations.

BACKGROUND

Drilling for hydrocarbons, such as oil and gas, typically involves the operation of drilling equipment at underground depths that can reach down to thousands of feet below the surface. Such remote distances of downhole drilling equipment, combined with unpredictable downhole operating conditions and vibrational drilling disturbances, creates numerous challenges in accurately controlling the trajectory of a wellbore. Compounding these problems is often the existence of neighboring wellbores, sometimes within close proximity of each other, that restricts the tolerance for drilling error. Drilling operations typically collect measurements from downhole sensors, located at or near a bottom hole assembly (BHA), to detect various conditions related to the drilling, such as position and angle of the wellbore trajectory, characteristics of the rock formation, pressure, temperature, acoustics, radiation, etc. Such sensor measurement data is typically transmitted to the surface, where human operators analyze the data to adjust the downhole drilling equipment. However, sensor measurements can be inaccurate, delayed, or infrequent, limiting the effectiveness of using such measurements. Often, a human operator is left to use best-guess estimates of the wellbore trajectory in controlling the drilling operation.

DETAILED DESCRIPTION

Figure 1:
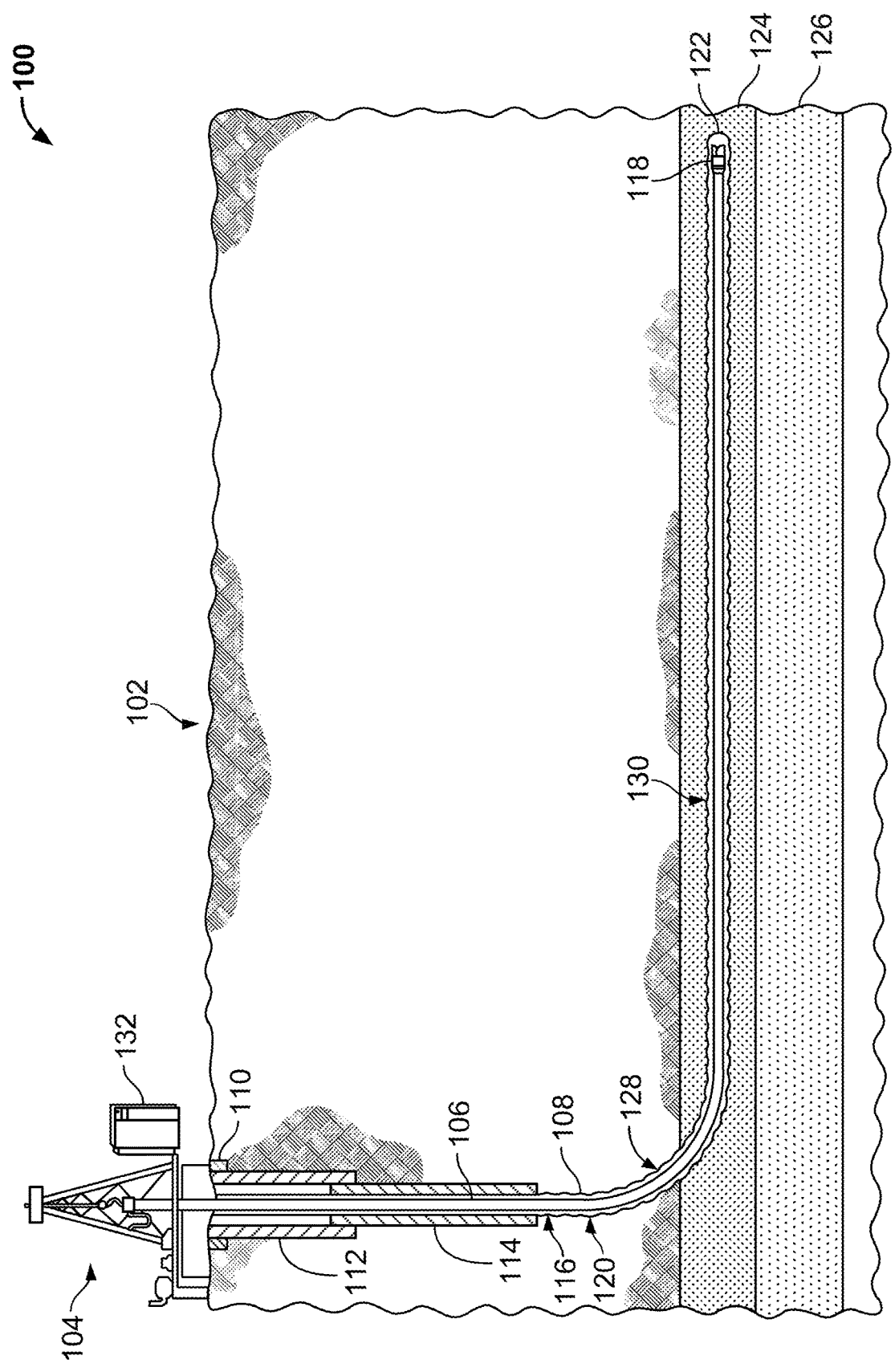
FIG. 1 illustrates an example of an implementation of at least a portion of a wellbore system in the context of a downhole operation.

This disclosure describes, generally, automated control of wellbore drilling operations by making model-based predictive control decisions for the BHA. In particular, techniques are described that dynamically adapt the BHA control inputs to emphasize different drilling objectives at different times based on changing conditions in the wellbore. The changing conditions in the wellbore may be determined using any suitable source of information, such as sensor measurements, model-based predictions, and/or wellbore planning information.

The BHA control inputs may be adapted to selectively emphasize (or de-emphasize) one or more objectives associated with the drilling operation, in response to changing conditions in the wellbore. As examples, the objectives may relate to reducing deviation from a planned wellbore path, reducing input energy consumption for the BHA, or any other suitable objective related to the drilling operation. During a drilling operation, changing conditions in the wellbore (e.g., different layers of rock, differently-shaped portions of a planned wellbore path, etc.) may result in different objectives being more or less important at different times to maintain an overall efficient and cost-effective drilling operation.

In some examples, the one or more objectives may be combined in a single overall objective function, in which different objectives are emphasized by different amounts, using one or more weighting factors. The adaptive nature of the BHA control inputs may be implemented by adapting the weighting factors to selectively emphasize different objectives in an objective function, and solving for the BHA control input that satisfies the overall objective function. The weighting factors may automatically adapt to changes in conditions in the wellbore. As examples, the weighting factors may automatically adapt to changes in the amount of uncertainty in the wellbore trajectory, different angles and turns along the planned wellbore path, the existence of neighboring wellbores that pose threats of collision, or other conditions in and around the wellbore that may be relevant to directional drilling systems.

In a general implementation, a computer-implemented method of controlling a bottom hole assembly (BHA) to follow a planned wellbore path, the method includes determining sensor measurements from the BHA; determining a model of BHA dynamics based on the sensor measurements from the BHA; determining a weighting factor that corresponds to a drilling objective; determining an objective function comprising the drilling objective, weighted by the weighting factor, and one or more constraints; determining a control input to the BHA that satisfies the objective function and the one or more constraints; and applying the control input to the BHA.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general implementations, determining a weighting factor that corresponds to a drilling objective further includes determining a weighting factor based on at least one of the model of BHA dynamics or the sensor measurements from the BHA.

In a second aspect combinable with any of the previous aspects, determining a weighting factor based on at least one of the model of BHA dynamics or the sensor measurements from the BHA includes determining at least one of an uncertainty of a measured wellbore trajectory, a shape of the wellbore, or collision avoidance information;

determining a weight based on at least one of the uncertainty of a measured wellbore trajectory, the shape of the wellbore, or the collision avoidance information; and synthesizing the weight into the weighting factor.

In a third aspect combinable with any of the previous aspects, determining an uncertainty of a measured wellbore trajectory includes determining covariance values between a plurality of azimuth values and inclination values for the wellbore trajectory.

In a fourth aspect combinable with any of the previous aspects, determining a weighting factor that corresponds to a drilling objective includes tightening a constraint on the control input to the BHA in a direction in which the uncertainty of the measured wellbore trajectory has increased from a previous measurement time.

In a fifth aspect combinable with any of the previous aspects, tightening a constraint on the control input to the BHA includes determining an increased value of a weighting factor associated with the control input to the BHA.

In a sixth aspect combinable with any of the previous aspects, the drilling objective includes a predicted deviation from the planned wellbore trajectory, and determining a weighting factor that corresponds to a drilling objective includes loosening a constraint on the predicted deviation from the planned wellbore trajectory in a direction in which the uncertainty of the measured wellbore trajectory has increased from a previous measurement time.

In a seventh aspect combinable with any of the previous aspects, loosening a constraint on the predicted deviation from the planned wellbore path includes determining a reduced value of a weighting factor associated with the predicted deviation from the planned wellbore path.

In an eighth aspect combinable with any of the previous aspects, determining a shape of the wellbore includes determining a radius of curvature for subsequent portion of the planned wellbore path.

In a ninth aspect combinable with any of the previous aspects, the drilling objective includes a predicted deviation from the planned wellbore trajectory, and determining a weighting factor includes reducing a constraint on the predicted deviation from the planned wellbore trajectory in a direction in which the radius of curvature for the future portion of the planned wellbore path has decreased from a previous measurement time.

In a tenth aspect combinable with any of the previous aspects, determining collision avoidance information includes determining a direction in which a collision with another wellbore is most likely to occur.

In an eleventh aspect combinable with any of the previous aspects, the drilling objective includes a predicted deviation from the planned wellbore trajectory, and determining a weighting factor includes increasing a constraint on the predicted deviation from the planned wellbore trajectory in the direction in which a collision with another wellbore is most likely to occur.

In a twelfth aspect combinable with any of the previous aspects, determining covariance values between a plurality of azimuth values and inclination values for the wellbore trajectory further includes determining a plurality of azimuth measurements and inclination measurements received from sensors of the BHA; and determining covariance values between the plurality of azimuth measurements and inclination measurements received from the sensors of the BHA.

In thirteenth aspect combinable with any of the previous aspects, determining covariance values between a plurality of azimuth values and inclination values for the wellbore trajectory further includes determining a plurality of azimuth predictions and inclination predictions based on the model of BHA dynamics; and determining covariance values between the plurality of azimuth predictions and inclination predictions based on the model of BHA dynamics.

In a fourteenth aspect combinable with any of the previous aspects, determining an objective function includes determining a predicted future deviation from the planned wellbore path; determining a predicted future cost of applying the control input to the BHA; and determining a weighted combination, weighted by the weighting factor, of the predicted future deviation from the planned wellbore path and the predicted future cost of applying the control input to the BHA.

In a fifteenth aspect combinable with any of the previous aspects, determining a weighting factor includes determining a first weighting factor for the predicted future deviation from the planned wellbore path; and determining a second weighting factor for the predicted future cost of applying the control input to the BHA.

In a sixteenth aspect combinable with any of the previous aspects, determining a control input to the BHA that satisfies the objective function includes determining a control input to the BHA that minimizes the weighted combination of the predicted future deviation from the planned wellbore path and the predicted future cost of applying the control input to the BHA over a subsequent period of time.

In a seventeenth aspect combinable with any of the previous aspects, the predicted future cost of applying the control input to the BHA includes a predicted energy consumption for the BHA.

An eighteenth aspect combinable with any of the previous aspects further includes determining a candidate control input to the BHA; determining a predicted wellbore trajectory, based on the candidate control input to the BHA and the model of BHA dynamics; and determining a predicted future deviation from the planned wellbore path based on a deviation between the predicted wellbore trajectory and the planned wellbore path.

In a nineteenth aspect combinable with any of the previous aspects, determining a control input to the BHA includes determining at least one of a first bend angle control, a second bend angle control, a first packer control, or a second packer control.

A twentieth aspect combinable with any of the previous aspects further includes determining updated sensor measurements from the BHA; determining an updated model of BHA dynamics based on the updated sensor measurements from the BHA; determining an updated weighting factor and an updated objective function based on at least one of the updated model of BHA dynamics or the updated sensor measurements from the BHA; and automatically adapting the control input to the BHA that satisfies the updated objective function based on the updated weighting factor.

In a twenty-first aspect combinable with any of the previous aspects, determining covariance values between the plurality of azimuth measurements and inclination measurements further includes determining a cross-correlation between uncertainty values in two different directions from the wellbore trajectory.

Various implementations of a control system for wellbore drilling according to the present disclosure may include none, one or some of the following features. For example, the system may improve the stability and robustness of drilling operations. In particular, techniques described herein may enable more accurate and precise control of the wellbore trajectory despite varying and unpredictable conditions in the wellbore environment.

For example, if a certain portion of the wellbore yields larger error and more uncertain measurements, then it may be desirable to put more weight on the objective of reducing input energy, thus constraining the input to employ more conservative drilling during times when the measured trajectory may not be an accurate reflection of the true trajectory in the wellbore. As another example, if a certain portion of the planned wellbore path has a sharp turn, then it may be desirable to put less weight on the objective of staying close to the planned wellbore path during those times, to allow more leeway while making the sharp turn and to avoid throttling the input (e.g., if staying close to the planned path is too costly or even impossible). By adaptively putting more or less emphasis on different objectives at different times during the drilling operation, techniques described herein may enable more efficient and more accurate drilling operation despite changing conditions in the wellbore.

In some examples, a model of BHA dynamics may be used to generate predictions of future wellbore trajectory, and the BHA control inputs may be proactively adapted based on the predicted wellbore trajectory. The model of BHA dynamics may be updated as new measurements are taken and as new control inputs are received, to enable close tracking of the true wellbore trajectory, for example, to enable less prediction error of the wellbore trajectory. The system may use these predictions, as well as planned wellbore path information and/or other information, to anticipate future changes in the wellbore and proactively adapt the drilling operation.

For example, the system may increase or decrease selected weighting factors of one or more objectives based on the anticipated changes in the wellbore, and automatically determine BHA control inputs that satisfy the adapted weighted objectives and one or more constraints. Satisfying the objectives may include, for example, performing an optimization (e.g., minimizing a cost function, maximizing a utility function, etc.), or may include finding sub-optimal solutions that approximate optimal solutions (e.g., numerical approximations that account for computational complexity, etc.), or may include satisfying other suitable objectives related to the drilling process. The determination of BHA control inputs that satisfy the objectives may involve satisfying one or more constraints, for example, the maximum bending angle, the maximum power available, etc.

The model along with the constraints determines a profile of all possible future BHA behaviors, based on which the optimal control inputs and the associated future BHA dynamics are determined by minimizing the objective function.

The downhole environment around a BHA in a wellbore is generally a complex system. In some examples, the system may include at least 4 control variables and 12 measurements. Conventional control strategies may not easily apply to BHA systems for various reasons, including the following. The interactions between different inputs and outputs can be strong and unpredictable, e.g., inclination measurements may depend on most of the control variables, such as two bend angles and packer inflation. In such scenarios, conventional design techniques, such as proportional-integral-derivative (PID), may be limited in achieving desired performance. For example, if an optimal solution to an objective function is desired, then PID controllers may be unable to achieve the desired optimal performance. Another difficulty is that the number of outputs may be greater than the number of inputs, and it may not always be clear how to decouple the interactions between certain inputs and output. This may result in complex and numerous options that complicate the design of the BHA input controls. In such scenarios, the performance of the drilling operation typically depends on the tuning skills of a control system designer, which may be subject to human error. Another difficulty with the number of measurements being greater than the number of control variables is that, under many cases, it may be difficult for all of the measurements to track their planned target values without encountering some offset. Such offset may lead to uncertainty in how to control the wellbore trajectory, which may lead to an overly-aggressive control that results in different outputs competing with each other. For example, if a near inclination sensor requires a larger bend angle, then this may result in more errors and uncertainty in one of the far inclination sensors. In some scenarios, this may result in a reduced stability margin, rendering the drilling operation more difficult to control accurately.

Techniques described herein provide a control strategy based on model-based predictive control (MPC), which enables regulating complex BHA systems, even those that may have strong interactions, while satisfying (e.g., optimizing) an overall objective function of the drilling operation and any associated constraints. Moreover, in scenarios in which the surrounding environment and design specification change quickly during a directional drilling operation, an adaptive weight tuning algorithm may be performed in conjunction with the MPC strategy to achieve a more robust and precise control.

The details of one or more implementations are set forth in the accompanying drawings and the description below. Other features, objects, and advantages will be apparent from the description and drawings, and from the claims.

FIG. 1 illustrates a portion of one implementation of a deviated wellbore system 100 according to the present disclosure. Although shown as a deviated system (e.g., with a directional, horizontal, or radiussed wellbore), the system can include a relatively vertical wellbore only (e.g., including normal drilling variations) as well as other types of wellbores (e.g., laterals, pattern wellbores, and otherwise). Moreover, although shown on a terranean surface, the system 100 may be located in a sub-sea or water-based environment. Generally, the deviated wellbore system 100 accesses one or more subterranean formations, and provides easier and more efficient production of hydrocarbons located in such subterranean formations. Further, the deviated wellbore system 100 may allow for easier and more efficient fracturing or stimulation operations. As illustrated in FIG. 1, the deviated wellbore system 100 includes a drilling assembly 104 deployed on a terranean surface 102. The drilling assembly 104 may be used to form a vertical wellbore portion 108 extending from the terranean surface 102 and through one or more geological formations in the Earth. One or more subterranean formations, such as productive formation 126, are located under the terranean surface 102. As will be explained in more detail below, one or more wellbore casings, such as a surface casing 112 and intermediate casing 114, may be installed in at least a portion of the vertical wellbore portion 108.

In some implementations, the drilling assembly 104 may be deployed on a body of water rather than the terranean surface 102. For instance, in some implementations, the terranean surface 102 may be an ocean, gulf, sea, or any other body of water under which hydrocarbon-bearing formations may be found. In short, reference to the terranean surface 102 includes both land and water surfaces and contemplates forming and/or developing one or more deviated wellbore systems 100 from either or both locations.

Generally, the drilling assembly 104 may be any appropriate assembly or drilling rig used to form wellbores or wellbores in the Earth. The drilling assembly 104 may use traditional techniques to form such wellbores, such as the vertical wellbore portion 108, or may use nontraditional or novel techniques. In some implementations, the drilling assembly 104 may use rotary drilling equipment to form such wellbores. Rotary drilling equipment is known and may consist of a drill string 106 and a bottom hole assembly (BHA) 118. In some implementations, the drilling assembly 104 may consist of a rotary drilling rig. Rotating equipment on such a rotary drilling rig may consist of components that serve to rotate a drill bit, which in turn forms a wellbore, such as the vertical wellbore portion 108, deeper and deeper into the ground. Rotating equipment consists of a number of components (not all shown here), which contribute to transferring power from a prime mover to the drill bit itself. The prime mover supplies power to a rotary table, or top direct drive system, which in turn supplies rotational power to the drill string 106. The drill string 106 is typically attached to the drill bit within the bottom hole assembly 118. A swivel, which is attached to hoisting equipment, carries much, if not all of, the weight of the drill string 106, but may allow it to rotate freely.

The drill string 106 typically consists of sections of heavy steel pipe, which are threaded so that they can interlock together. Below the drill pipe are one or more drill collars, which are heavier, thicker, and stronger than the drill pipe. The threaded drill collars help to add weight to the drill string 106 above the drill bit to ensure that there is enough downward pressure on the drill bit to allow the bit to drill through the one or more geological formations. The number and nature of the drill collars on any particular rotary rig may be altered depending on the downhole conditions experienced while drilling.

The drill bit is typically located within or attached to the bottom hole assembly 118, which is located at a downhole end of the drill string 106. The drill bit is primarily responsible for making contact with the material (e.g., rock) within the one or more geological formations and drilling through such material. According to the present disclosure, a drill bit type may be chosen depending on the type of geological formation encountered while drilling. For example, different geological formations encountered during drilling may require the use of different drill bits to achieve maximum drilling efficiency. Drill bits may be changed because of such differences in the formations or because the drill bits experience wear. Although such detail is not critical to the present disclosure, there are generally four types of drill bits, each suited for particular conditions. The four most common types of drill bits consist of: delayed or dragged bits, steel to rotary bits, polycrystalline diamond compact bits, and diamond bits. Regardless of the particular drill bits selected, continuous removal of the "cuttings" is essential to rotary drilling.

The circulating system of a rotary drilling operation, such as the drilling assembly 104, may be an additional component of the drilling assembly 104. Generally, the circulating system has a number of main objectives, including cooling and lubricating the drill bit, removing the cuttings from the drill bit and the wellbore, and coating the walls of the wellbore with a mud type cake. The circulating system consists of drilling fluid, which is circulated down through the wellbore throughout the drilling process. Typically, the components of the circulating system include drilling fluid pumps, compressors, related plumbing fixtures, and specialty injectors for the addition of additives to the drilling fluid. In some implementations, such as, for example, during a horizontal or directional drilling process, downhole motors may be used in conjunction with or in the bottom hole assembly 118. Such a downhole motor may be a mud motor with a turbine arrangement, or a progressive cavity arrangement, such as a Moineau motor. These motors receive the drilling fluid through the drill string 106 and rotate to drive the drill bit or change directions in the drilling operation.

In many rotary drilling operations, the drilling fluid is pumped down the drill string 106 and out through ports or jets in the drill bit. The fluid then flows up toward the surface 102 within an annular space (e.g., an annulus) between the wellbore portion 108 and the drill string 106, carrying cuttings in suspension to the surface. The drilling fluid, much like the drill bit, may be chosen depending on the type of geological conditions found under subterranean surface 102. For example, certain geological conditions found and some subterranean formations may require that a liquid, such as water, be used as the drilling fluid. In such situations, in excess of 100,000 gallons of water may be required to complete a drilling operation. If water by itself is not suitable to carry the drill cuttings out of the bore hole or is not of sufficient density to control the pressures in the well, clay additives (bentonite) or polymer-based additives, may be added to the water to form drilling fluid (e.g., drilling mud). As noted above, there may be concerns regarding the use of such additives in underground formations which may be adjacent to or near subterranean formations holding fresh water.

In some implementations, the drilling assembly 104 and the bottom hole assembly 118 may operate with air or foam as the drilling fluid. For instance, in an air rotary drilling process, compressed air lifts the cuttings generated by the drill bit vertically upward through the annulus to the terranean surface 102. Large compressors may provide air that is then forced down the drill string 106 and eventually escapes through the small ports or jets in the drill bit. Cuttings removed to the terranean surface 102 are then collected.

As noted above, the choice of drilling fluid may depend on the type of geological formations encountered during the drilling operations. Further, this decision may be impacted by the type of drilling, such as vertical drilling, horizontal drilling, or directional drilling. In some cases, for example, certain geological formations may be more amenable to air drilling when drilled vertically as compared to drilled directionally or horizontally.

As illustrated in FIG. 1, the bottom hole assembly 118, including the drill bit, drills or creates the vertical wellbore portion 108, which extends from the terranean surface 102 towards the target subterranean formation 124 and the productive formation 126. In some implementations, the target subterranean formation 124 may be a geological formation amenable to air drilling. In addition, in some implementations, the productive formation 126 may be a geological formation that is less amenable to air drilling processes. As illustrated in FIG. 1, the productive formation 126 is directly adjacent to and under the target formation 124. Alternatively, in some implementations, there may be one or more intermediate subterranean formations (e.g., different rock or mineral formations) between the target subterranean formation 124 and the productive formation 126.

In some implementations of the deviated wellbore system 100, the vertical wellbore portion 108 may be cased with one or more casings. As illustrated, the vertical wellbore portion 108 includes a conductor casing 110, which extends from the terranean surface 102 shortly into the Earth. A portion of the vertical wellbore portion 108 enclosed by the conductor casing 110 may be a large diameter wellbore. For instance, this portion of the vertical wellbore portion 108 may be a 17½" wellbore with a 13⅜" conductor casing 110. Additionally, in some implementations, the vertical wellbore portion 108 may be offset from vertical (e.g., a slant wellbore). Even further, in some implementations, the vertical wellbore portion 108 may be a stepped wellbore, such that a portion is drilled vertically downward and then curved to a substantially horizontal wellbore portion. The substantially horizontal wellbore portion may then be turned downward to a second substantially vertical portion, which is then turned to a second substantially horizontal wellbore portion. Additional substantially vertical and horizontal wellbore portions may be added according to, for example, the type of terranean surface 102, the depth of one or more target subterranean formations, the depth of one or more productive subterranean formations, and/or other criteria.

Downhole of the conductor casing 110 may be the surface casing 112. The surface casing 112 may enclose a slightly smaller wellbore and protect the vertical wellbore portion 108 from intrusion of, for example, freshwater aquifers located near the terranean surface 102. The vertical wellbore portion 108 may than extend vertically downward toward a kickoff point 120, which may be between 500 and 1,000 feet above the target subterranean formation 124. This portion of the vertical wellbore portion 108 may be enclosed by the intermediate casing 114. The diameter of the vertical wellbore portion 108 at any point within its length, as well as the casing size of any of the aforementioned casings, may be an appropriate size depending on the drilling process.

Upon reaching the kickoff point 120, drilling tools such as logging and measurement equipment may be deployed into the wellbore portion 108. At that point, a determination of the exact location of the bottom hole assembly 118 may be made and transmitted to the terranean surface 102. Further, upon reaching the kickoff point 120, the bottom hole assembly 118 may be changed or adjusted such that appropriate directional drilling tools may be inserted into the vertical wellbore portion 108.

As illustrated in FIG. 1, a curved wellbore portion 128 and a horizontal wellbore portion 130 have been formed within one or more geological formations. Typically, the curved wellbore portion 128 may be drilled starting from the downhole end of the vertical wellbore portion 108 and deviated from the vertical wellbore portion 108 toward a predetermined azimuth gaining from between 9 and 18 degrees of angle per 100 feet drilled. Alternatively, different predetermined azimuth may be used to drill the curved wellbore portion 128. In drilling the curved wellbore portion 128, the bottom hole assembly 118 often uses measurement-while-drilling ("MWD") equipment to more precisely determine the location of the drill bit within the one or more geological formations, such as the target subterranean formation 124. Generally, MWD equipment may be utilized to directionally steer the drill bit as it forms the curved wellbore portion 128, as well as the horizontal wellbore portion 130.

Alternatively to or in addition to MWD data being compiled during drilling of the wellbore portions shown in FIG. 1, certain high-fidelity measurements (e.g., surveys) may be taken during the drilling of the wellbore portions. For example, surveys may be taken periodically in time (e.g., at particular time durations of drilling, periodically in wellbore length (e.g., at particular distances drilled, such as every 30 feet or otherwise), or as needed or desired (e.g., when there is a concern about the path of the wellbore). Typically, during a survey, a completed measurement of the inclination and azimuth of a location in a well (typically the total depth at the time of measurement) is made in order to know, with reasonable accuracy, that a correct or particular wellbore path is being followed (e.g., according to a wellbore plan). Further, position may be helpful to know in case a relief well must be drilled. High-fidelity measurements may include inclination from vertical and the azimuth (or compass heading) of the wellbore if the direction of the path is critical. These high-fidelity measurements may be made at discrete points in the well, and the approximate path of the wellbore computed from the discrete points. The high-fidelity measurements may be made with any suitable high-fidelity sensor. Examples include, for instance, simple pendulum-like devices to complex electronic accelerometers and gyroscopes. For example, in simple pendulum measurements, the position of a freely hanging pendulum relative to a measurement grid (attached to the housing of a measurement tool and assumed to represent the path of the wellbore) is captured on photographic film. The film is developed and examined when the tool is removed from the wellbore, either on wireline or the next time pipe is tripped out of the hole.

The horizontal wellbore portion 130 may typically extend for hundreds, if not thousands, of feet within the target subterranean formation 124. Although FIG. 1 illustrates the horizontal wellbore portion 130 as exactly perpendicular to the vertical wellbore portion 108, it is understood that directionally drilled wellbores, such as the horizontal wellbore portion 130, have some variation in their paths. Thus, the horizontal wellbore portion 130 may include a "zigzag" path yet remain in the target subterranean formation 124. Typically, the horizontal wellbore portion 130 is drilled to a predetermined end point 122, which, as noted above, may be up to thousands of feet from the kickoff point 120. As noted above, in some implementations, the curved wellbore portion 128 and the horizontal wellbore portion 130 may be formed utilizing an air drilling process that uses air or foam as the drilling fluid.

The wellbore system 100 also includes a controller 132 that is communicative with the BHA 118. The controller 132 may be located at the wellsite (e.g., at or near drilling assembly 104) or may be remote from the wellsite. The controller 132 may also be communicative with other systems, devices, databases, and networks. Generally, the controller 132 may include a processor based computer or computers (e.g., desktop, laptop, server, mobile device, cell phone, or otherwise) that includes memory (e.g., magnetic, optical, RAM/ROM, removable, remote or local), a network interface (e.g., software/hardware based interface), and one or more input/output peripherals (e.g., display devices, keyboard, mouse, touchscreen, and others).

The controller 132 may at least partially control, manage, and execute operations associated with the drilling operation of the BHA. In some aspects, the controller 132 may control and adjust one or more of the illustrated components of wellbore system 100 dynamically, such as, in real-time during drilling operations at the wellbore system 100. The real-time control may be adjusted based on sensor measurement data or based on changing predictions of the wellbore trajectory, even without any sensor measurements.

The controller 132 may perform such control operations based on a model of BHA dynamics. The model of BHA dynamics may simulate various physical phenomena in the drilling operation, such as vibrational disturbances and sensor noise. The controller 132 may use the model of BHA dynamics to determine a predicted wellbore trajectory and adapt one or more weighting factors to selectively emphasize or de-emphasize different objectives related to the drilling.

In general, a model of BHA dynamics may rely on an underlying state variable that evolves with time, representing changing conditions in the drilling operation. The state variable in the model of BHA dynamics is an estimate of the true state of the BHA, from which estimates of wellbore trajectory can be derived. The time evolution of the BHA dynamics may be represented by a discrete-time state-space model, an example of which may be formulated as:

$$x(k+1)=Ax(k)+Bu(k)+w(k)$$

$$y(k)=Cx(k)+v(k) \quad (1)$$

where the matrices A, B, and C are system matrices that represent the underlying dynamics of BHA drilling and measurement. The system matrices A, B, and C are determined by the underlying physics and mechanisms employed in the drilling process. In practice, these matrices are estimated and modeled based on experience. The state $x(k)$ is a vector that represents successive states of the BHA system, the input $u(k)$ is a vector that represents BHA control inputs, and the output $y(k)$ is a vector that represents the observed (measured) trajectory of wellbore.

In some aspects, the vector $w(k)$ represents process noise and the vector, $v(k)$, represents measurement noise. The process noise $w$ accounts for factors such as the effects of rock-bit interactions and vibrations, while the measurement noise $v$ accounts for noise in the measurement sensors. The noise processes $w(k)$ and $v(k)$ may not be exactly known, although reasonable guesses can be made for these processes, and these guesses can be modified based on experience. The noise vectors $w(k)$ and $v(k)$ are typically modeled by Gaussian processes, but non-Gaussian noise can also be modeled by modifying the state x and matrix A to include not only the dynamics described by the states variables, but also the dynamics of stochastic noise, as described further below.

In the examples discussed below, the BHA control input vector $u(t)$ includes 6 control variables, representing first and second bend angles of the BHA, a depth of the BHA, activation of first and second packers (e.g., by inflation of the packers, mechanical compression of the packers, etc.), and a separation of the packers. The output vector $y(t)$ includes 12 observed measurement values, including 6 measurement values from a near inclinometer and magnetometer package and another 6 measurements from a far inclinometer and magnetometer package (hereinafter, "inc/mag"). The state vector $x(t)$ is a vector of dimension $12+n_d$, which includes 12 states that represent the actual azimuth and inclination values, as would be observed (measured) by the near and far inc/mag packages. The value $n_d$ is the order of a disturbance model which filters the un-modeled disturbances, and adds to the 12 states representing the system dynamics.

The state transition matrix A is therefore, in this example, a $(12+n_d)$ by $(12+n_d)$ dimensional state transition matrix that represents the underlying physics, the matrix B is a $(12+n_d)$ by 6 dimensional matrix that governs the relation between the control variables and the state of the system, and the matrix C is a 12 by $(12+n_d)$ matrix that governs the relation between the observations, y, and the state of the system, x. The matrices A, B, and C may be determined using any suitable estimation or modeling technique, such as a lumped-mass system model. There can be more states if more complex dynamic model is used to describe the system.

Due to the random noise and potential inaccuracies in modeling the system matrices A, B, and C, the state x of the model of BHA dynamics in Equation 1 is, in general, not exactly known, but rather inferred. In these scenarios, Equation 1 may be used to determine inferences, or estimates, of the state x and measurements y, rather than their true values. In particular, the model of Equation 1 may be used to generate predictions of future values of state x and observations y. Such predictions may take into account actual measurements to refine the model dynamics in Equation 1.

For example, the following equation may be used to obtain an estimate $\hat{x}$ of the next state of the BHA system, in the absence of any current measurements:

$$\hat{x}(k+1)=A\hat{x}(k)+Bu(k)$$

$$\hat{y}(k)=C\hat{x}(k) \quad (2)$$

If current measurements y are available, then predictions may be generated by using Kalman filtering update equations:

$$\hat{x}(k+1)=A\hat{x}(k)+Bu(k)+K[y(k)-\hat{y}(k)]$$

$$\hat{y}(k)=C\hat{x}(k) \quad (3)$$

In Equation 3, $\hat{y}(k)$ represents the actual observation (e.g., provided by high-fidelity sensor measurements, MWD sensor measurements, or any other suitable sensor measurements). The factor K (e.g., a time-varying factor), also known as the Kalman observation gain, represents a correction factor to account for the error between the actual trajectory and the estimated trajectory, $y(k)-\hat{y}(k)$. In general, a larger value of K implies that more weight is given to the measured observation $y(k)$ in determining the estimate of the next state $\hat{x}(k+1)$. Typically, K depends on the amount of vibration and reaction force that is affecting the drill bit. The value of K may be chosen according to any suitable criterion (e.g., minimize mean-squared error of state estimate, or any other suitable criterion), to achieve a desired tradeoff between relative importance of measured observations and underlying model dynamics.

The model of BHA dynamics in Equation 1 may be updated dynamically as new information is received by the controller (e.g., the controller 132 in FIG. 1). For example, matrices A and B may be affected by the operating conditions in the wellbore, as the model (e.g., in equation 1) may be re-linearized as the operating condition changes. Such re-linearization may be performed, for example, when it is determined that the BHA enters a different subsurface formation, or when the drilling operation changes direction from a straight drilling direction to a curved drilling trajectory. In general, the model of BHA dynamics may be updated for a variety of reasons as the drilling environment changes.

A model-based predictive controller may use the model of BHA dynamics in Equation 1 to generate predictions of future wellbore trajectory, and based on these predictions, determine BHA input controls that satisfy (e.g., optimize) a desired objective function while also satisfying one or more constraints. The objective function may be a combination of one or more objectives, weighted by at least one weighting factor. The weighting factors may be dynamically adapted, based on measurements, predictions and other information, in response to changing conditions in the wellbore.

As an illustrative example, the objective function may minimize, over a future horizon of time, a weighted combination of two objectives: (1) a deviation from a planned wellbore path, and (2) an input energy consumed by the BHA, subject to a set of constraints. One example formulation of such an example objective function is shown in Equations 4 and 5 below:

$$\min_u \sum_{k=t}^{n+T} [(y(k) - y^{sp}(k))^T Q(k)(y(k) - y^{sp}(k)) + \Delta u(k)^T S(k) \Delta u(k)] \quad (4)$$

$$\text{subject to } \begin{cases} y(k) = G(k)u(k) \\ u^{min} \le u(k) \le u^{max} \\ y^{min} \le y(k) \le y^{max} \end{cases} \quad (5)$$

where $y^{sp}$ is the planned wellbore path, t denotes the current time instant and T is the prediction horizon (which may be finite to obtain a dynamic solution, or may be infinite to obtain a steady-state solution). The first term in the objective function in Equation 4 is a quadratic term that corresponds to the objective of minimizing a squared deviation from the planned wellbore path, weighted by a weighting matrix Q(k) (which may be time-varying). The second term in Equation 5 is a quadratic term that corresponds to an objective of minimizing a squared change in the input controls, which represents input energy consumption, weighted by a weighting matrix S(k)(which may be time-varying). In the second term, it is assumed that the downhole power consumption is proportional to change rates of input controls (e.g., bend angles and activation of packers). The change in input controls is the difference between the input controls in successive time steps, $\Delta u(k) = u(k) - u(k-1)$. The function $G(\bullet)$ is an input-output representation based on the model of BHA dynamics in Equation 1. In particular, the function $G(\bullet)$ may use either Equation 2 (for updates without measurements) or Equation 3 (for updates with measurements) to yield next-step predictions of the measurement y based on a desired BHA input control u.

In the current time step t, after solving the objective function in Equation 4 to generate a desired control signal sequence u(k), k=t, t+1, ..., (t+T), only the first control signal u(t) is applied to the BHA. At the next time instant t+1, the objective function in Equation 4 is solved again to generate the next sequence of controls, u(k), k=t+1, ..., (t+1+T), of which the first control u(t+1) is applied to the BHA. These iterations continue, looking ahead T steps into the future to yield the best current-step control u that should be applied to the BHA to satisfy the objective function in Equation 4. In each iteration, the weighting factors in matrices Q and S may be updated based on measurements and predictions, to adapt to changing conditions in the wellbore.

In some examples, the weighting matrix Q may be in a diagonal form, where the terms along the diagonal distribute different weights to the 12 inclinometer and magnetometer measurements. The resulting control effort is determined by the mechanical and formation properties of the rock layers in the drilling environment. For example, if Q is an identity matrix, the weight given to each measurement variable is based on their steady-state gains. However, in some examples, it may be desirable to adjust the weighting factors in Q to selectively emphasize (or de-emphasize) specific measurements. A larger weighting factor for a particular measurement variable indicates that the BHA input controls should be designed in a way that forces a tighter (more accurate) control for that particular measurement variable. Conversely, a smaller weighting factor for a particular measurement variable indicates that the BHA input controls can be designed in way that allows a looser (less accurate) control for that particular measurement variable.

In general, the objective function is not necessarily limited to an equation that expresses a weighting factor as a coefficient, as in the example of Equation 4. More generally, the objective function may represent any suitable combination of one or more objectives, and the weighting factor may represent any suitable quantification of a tradeoff between different objectives. For example, if the objective function includes the objectives of reducing deviation from a planned wellbore path and reducing input energy, then the weighting factor may generally represent a tradeoff between deviation and energy.

Solving the objective function may involve any suitable technique, such as iterative techniques, numerical techniques, or heuristic-based techniques (or other suitable techniques) in which a weighting factor is used to select a control input that achieves a desired tradeoff between different objectives. For example, if the objective function (with constraints) is expressed as in Equations 4 and 5, then the solution may involve any suitable optimization-solving technique. As another example, solving an objective function may involve a series of steps that lead to a desired control input. For example, a two-step process may include: first, a set of candidate BHA control inputs may be obtained that achieves minimum or near-minimum input energy (for a given set of constraints), and second, an input may be chosen from the set of candidate inputs that achieves a desired deviation from the planned wellbore path. The desired deviation may be chosen, with respect to the input energy, using a suitable quantification of tradeoff (e.g., a ratio between energy and deviation, a maximum deviation for a given minimum input energy, or some other notion of tradeoff), representing a weighting factor.

Figure 2:
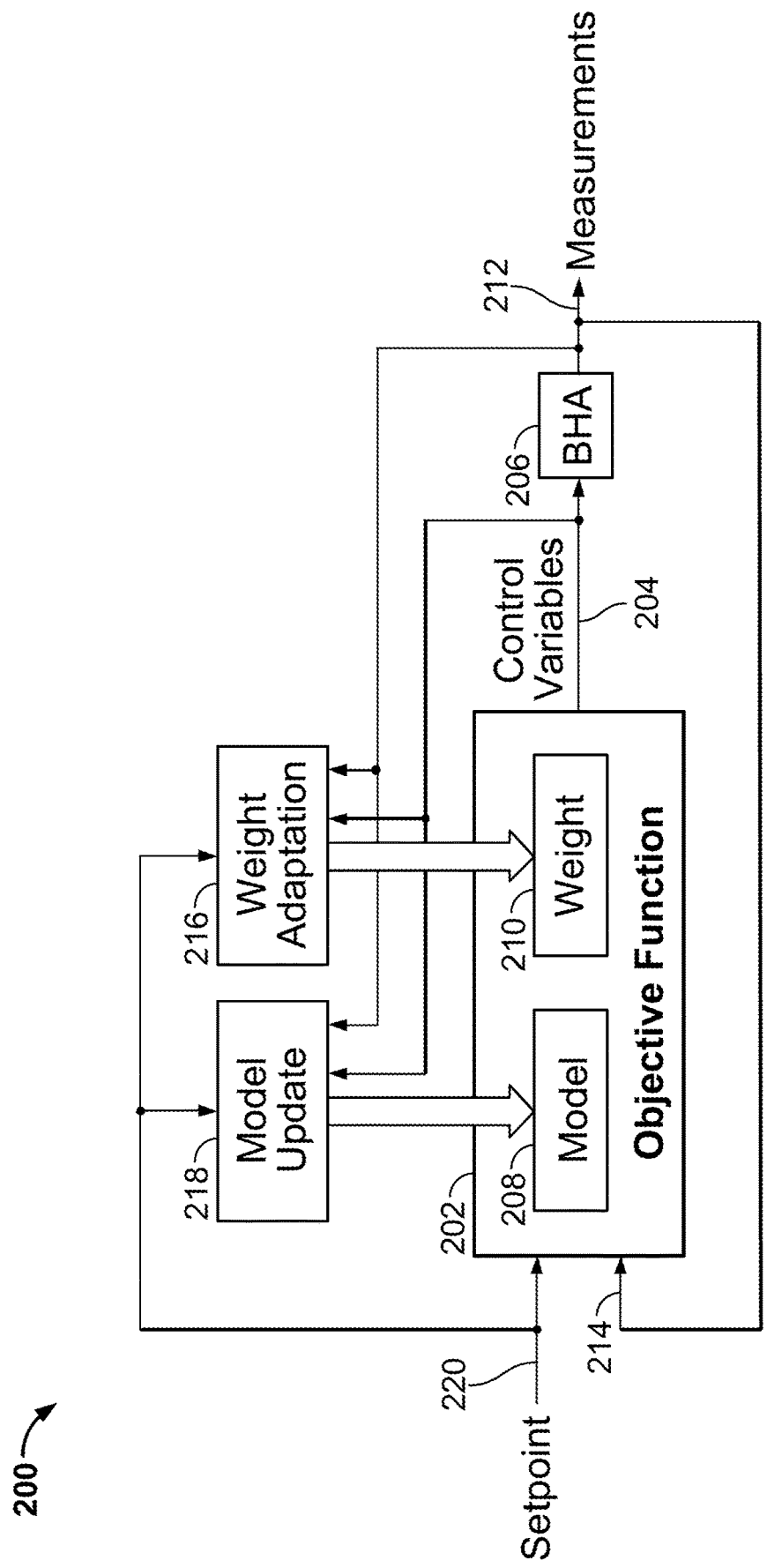
FIG. 2 illustrates an example of a processing flow for model-based predictive control that dynamically adapts weighting factors in response to changing conditions in the wellbore.

FIG. 2 illustrates an example of a processing flow for model-based predictive control of a BHA that dynamically adapts weighting factors in response to changing conditions in the wellbore. The example processing flow 200 of FIG. 2 may be performed, for example, by a controller (e.g., controller 132 in FIG. 1) of a BHA (e.g., BHA 118 in FIG. 1). In the example of FIG. 2, in block 202, an objective function (e.g., the objective function in Equation 4) is solved in order to generate a control input 204 to a BHA 206 (e.g., BHA 118 in FIG. 1). The objective function may be based on a model of BHA dynamics 208 (e.g., the model in Equation 1) and may include any number of suitable objectives, weighted by one or more weighting factors 210 (e.g., the weighting factors in matrices Q and S in Equation 4).

In the example of FIG. 2, sensor measurements 212 from the BHA may be used to update the objective function solution in block 202, via measurement feedback 214. In addition, one or more other parts of the drilling operation may be updated based on sensor measurements 212. For example, the weighting factors in the weight matrices Q and S may be dynamically adapted, in block 216, based on changing conditions in the wellbore, using measurements 212 from the BHA. Furthermore, the model of BHA dynamics may also be updated, in block 218, based on sensor measurements 212. These dynamic updates may enable the BHA input controls 204 to adapt to complicated changes in the downhole environment. Such adaptations may enable more accurate BHA control inputs and more efficient overall drilling operations, as compared to using constant weighting matrices that are pre-determined during a design stage.

In some examples, the weight adaptation block 216 may use sensor measurements 212 to determine an uncertainty of the wellbore trajectory, and may then adapt the weighting factors (e.g., the weighting factors in matrices Q and S in Equation 4) based on the determined uncertainty. In some examples, the weight adaptation block 216 may additionally or alternatively determine predictions of future uncertainty, using a model of BHA dynamics and state update equations (e.g., state update Equations 2 and/or 3). The weight adaptation block 216 may adapt the weighting factors to put more or less emphasis on certain BHA input controls, based on the uncertainty of the wellbore trajectory in particular directions.

As an example, vibrations in the drilling process may occur in different directions as the drilling operates in different portions of the wellbore. Such vibrations may increase the uncertainty of the wellbore trajectory. It may be desirable to dynamically increase weighting factors in particular directions as the uncertainty grows (or dynamically decrease the weighting factors as uncertainty reduces). The weight adaptation block 216 may automatically determine the uncertainty, based on measurements or model-based predictions, and adapt the weighting factors accordingly.

In addition, in the example of FIG. 2, the weight adaptation block 216, as well as the model update block 218 and the objective function solver in block 202, may also adapt to other information, such as wellbore planning information 220. The planning information 220 may include, as examples, a planned wellbore path and information regarding other wellbores in the vicinity of the wellbore. In some examples, the weight adaptation block 216 and/or the model update block 218 may also utilize planning information 220 to update the weights (e.g., weighting factors in matrices Q and S in Equation 4) and the model of BHA dynamics (e.g., the model of BHA dynamics in Equation 1).

The weight adaptation block 216 may update the weighting factors in matrices Q and S based on a synthesis of one or more weight adaptation mechanisms based on measurements, predictions, and/or planning information described above. These weighting factor updates may occur on any suitable time scale, such as every time step, or every time a measurement is taken, as appropriate.

Some examples of weight adaption mechanisms are provided below, but other adaption mechanisms may also be used which are relevant to determining the weighting factors (and, as a consequence, the BHA control inputs). For example, the weight matrices Q and/or S may be adapted based on a measured characteristic of the downhole drilling, such as torque on the BHA, or based on a constraint on an input to the BHA, such as fluid flow, or angular position of downhole tools. In general, for any suitable input or output of the drilling operation, one or more weighting factors may be defined to adaptively regulate a constraint to be placed on that input or output.

The examples below describe three possible adaption mechanisms, using three different types of information, for dynamically adjusting the weighting factors. These adaptation mechanisms are based on: uncertainty of the wellbore trajectory, planned wellbore path, and anti-collision information.

As a first example of a weight adaptation mechanism, the weighting factors may be determined based on uncertainty. In general, sensor measurements (e.g., MWD data, survey data, etc.) may improve the accuracy of wellbore tracking and trajectory estimation. In practice, however, the presence of sensor noise and process noise (e.g., reaction force from rock formations, vibrations, etc.) create uncertainties in the sensor measurements. The uncertainty of the measured wellbore trajectory can be characterized by a covariance matrix $\Sigma_y$. In some examples, the matrix $\Sigma_y$ may be determined by computing covariance values between a plurality of measured azimuth values and measured inclination values collected over time for the wellbore trajectory. In some examples, in addition or as an alternative to using sensor measurements, the matrix $\Sigma_y$ may be determined by using predictions of the wellbore trajectory (e.g., as determined by the model of BHA dynamics state updates in Equations 2 and/or 3) to generate predictions of future uncertainty in the wellbore trajectory.

In this example, the diagonal elements of the covariance matrix $\Sigma_y$ are the variances for each of the 12 inc/mag measurements. The off-diagonal elements of the covariance matrix $\Sigma_y$ are the covariance values between pairs of different inc/mag measurements, which describe the amount of correlations between the measurements.

In the example above, if a sensor measurement y has a large amount of uncertainty in a particular direction (e.g., due to large vibrational forces emanating from that drilling direction), then this usually indicates that the measurement is less trustworthy and the true wellbore trajectory has a wide margin of error in that direction. In such scenarios, it may be desirable to apply more input control effort in the direction of uncertainty. Additionally or alternatively, it may be desirable to place less emphasis on maintaining a small deviation between the measured trajectory and the planned wellbore path in the direction of uncertainty (since the measured trajectory is less trustworthy in that direction). In terms of weighting factors, this may be implemented by either decreasing the weighting factor for the output (e.g., the weight matrix Q in the first quadratic term of Equation 4) or by increasing the weighting factor for the input (e.g., the weight matrix S in the second quadratic term of Equation 4). In some examples, increasing the weighting factor for the input may correspond to tightening a constraint on the input (e.g., reducing a maximum amplitude constraint, reducing an average power constraint, etc.). Analogously, in some examples, decreasing the weighting factor for the output may correspond to loosening a constraint on the output (e.g., increasing a maximum bound on deviation from the planned wellbore trajectory, increasing a probability of deviating beyond a predetermined amount from the planned wellbore trajectory, etc.).

For example, one way of quantifying the adaptation of output weighting factor, Q, to account for uncertainty is:

$$Q = Q_0 \Sigma_y^{-1} \qquad (6)$$

where $Q_0$ is the relative importance of each output (measurement). In some examples, $Q_0$ may be set as identity matrix 112, though $Q_0$ may be any suitable matrix that assigns weighting factors to different measurement directions. The matrix formulation of Equation 6 enables application of input controls along any cross-direction, without necessarily being limited to any particular axis of direction.

Figure 3:
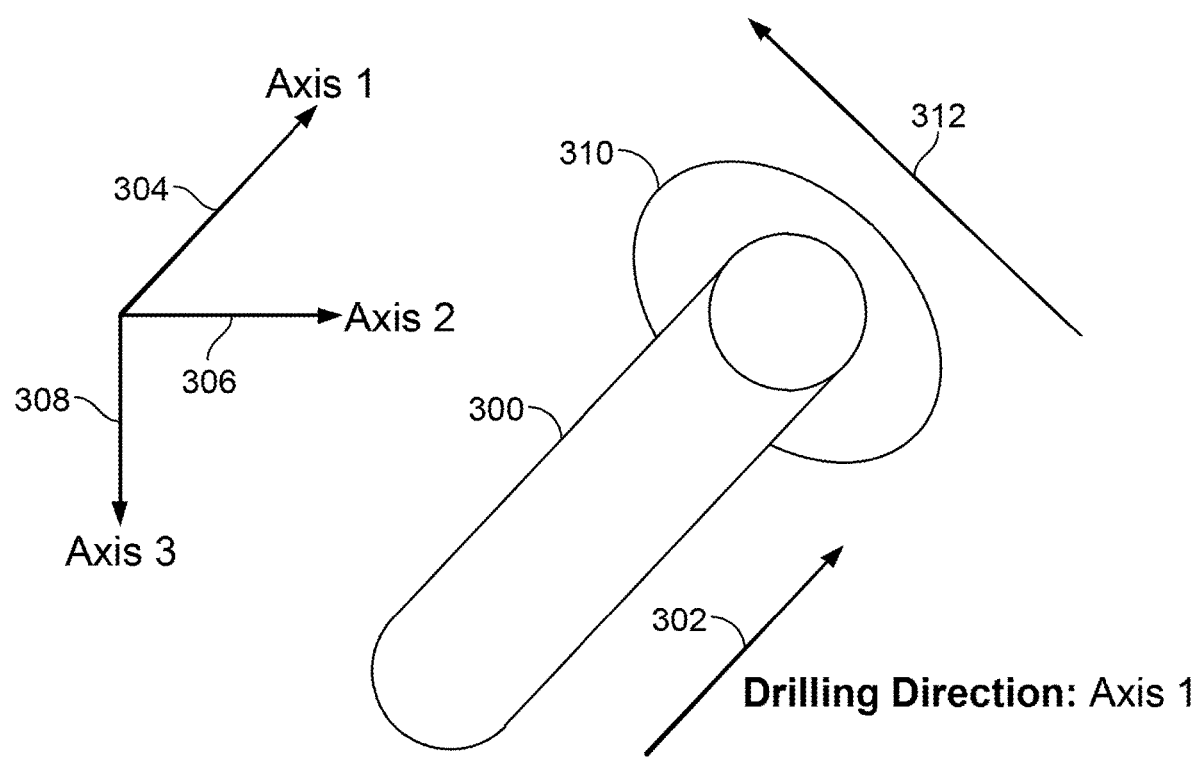
FIG. 3 illustrates a 3-dimensional example of correlated uncertainty values between different directions in a wellbore trajectory.

FIG. 3 illustrates a 3-dimensional example of correlated uncertainty between directions in the wellbore trajectory. In this example, a horizontal wellbore 300 has a trajectory along a drilling direction 302 that is parallel to a first axis direction 304. It is determined, based on sensor measurements, that the second axis direction 306 and the third axis direction 308 are both equally affected by drilling vibrations. As an example, the output uncertainty may be expressed as the covariance matrix $$\Sigma_y = \begin{bmatrix} 1 & 2 \\ 2 & 6 \end{bmatrix}.$$

In this example, the diagonal values (1 and 6) are the variances of the $2^{nd}$ and $3^{rd}$ axes. The off-diagonal values (2 and 2) are the covariance (correlation) between the $2^{nd}$ and $3^{rd}$ axes. Since the correlation between the $2^{nd}$ and $3^{rd}$ axes is the same as the correlation between the $3^{rd}$ and $2^{nd}$ axes, the off-diagonal elements are the same An illustration of this is shown in FIG. 3, in which the elliptical ring 310 represents the uniform uncertainty between the second axis direction 306 and the third axis direction 308, and the directional correlation 312 represents the correlation between the second axis direction 306 and the third axis direction 308. By Equation 6, the corresponding output weight matrix is determined to be $$Q = \begin{bmatrix} 3 & -1 \\ -1 & 0.5 \end{bmatrix},$$

using an initial weight matrix of $Q_0=I$. The off-diagonal elements suggest the MPC should not only control the BHA along the second axis direction 306 and the third axis direction 308 during drilling, but should also take into account the cross-correlation between the second and third axis directions (or, in general, between any two principal axes), which is represented by the directional correlation 312 in FIG. 3. This example illustrates how weight adaptation based on covariance matrix computations enables adapting the BHA input controls to trajectory uncertainties along any direction. Such adaptations may reduce correlations in uncertainty and help to prevent vibrations along one direction from affecting other directions of drilling.

Additionally or alternatively to adapting the output weight matrix Q, the input weight matrix S may be adapted to changes in uncertainty. Adapting the input weight matrix S may suppress or amplify the BHA input control movement. For example, when the uncertainty of the wellbore trajectory is large in a particular direction, it may be desirable to employ more BHA control efforts in that particular direction (to improve the accuracy of controlling the BHA in that direction), and the weight associated with the particular input direction may be adapted to automatically implement those changes. As an example, the following equation may be used to determine the input movement weight matrix S:

$$S = \overline{G} \Sigma^\dagger \Sigma_y \quad (7)$$

where $\overline{G}$ denotes the steady-state gain of the model (e.g., the steady-state value of the input-output gain $G(\bullet)$ in Equation 5) and the operation $(\bullet)^\dagger$ denotes a pseudo-inverse (since the transfer function matrix of a drilling process may be non-square, i.e., the number of control variables and output measurements may not be equal). Equation 7 translates output wellbore uncertainty into the BHA input control efforts, according to the contribution of each input variable to the overall output. As an illustrative example, assume that a near inclination sensor in the third axis direction is controlled by two bend angles, and that the steady-state gain is $\overline{G}=[1\ 2]$. The pseudo inverse is $\overline{G}^\dagger=[0.2\ 0.4]^T$, meaning that a unit uncertainty of inclination measurement in the third axis direction results in input movement weight 0.2 and 0.4 for the first and second bend angle, respectively. This result coincides with intuition because the impact of the second bend angle is double the impact of the first bend angle, as suggested by the steady-state gain.

Another factor to be considered in determining weighting factors, in addition or as an alternative to using uncertainty of wellbore trajectory, is the shape of the wellbore. In some examples, the wellbore path is determined at a design stage or is provided by an upper level decision-making algorithm. In such scenarios, it may be possible to use a planned wellbore path as feedforward information to adjust the output weight matrix Q. When the planned wellbore path has a sharp turn, i.e., the radius of curvature becomes smaller, stochastic impacts in the drilling, such as side forces, may become stronger, leading to a larger uncertainty matrix. In some examples, instead of waiting for the drill bit to become deflected and start turning due to the side forces (and consequently the uncertainty becoming larger), a feedforward mechanism may be used to proactively adapt the output weight matrix Q ahead of time based on the planned wellbore path information. The feedforward mechanism may be either model-based or may be data-driven. An example of a model-based feedforward algorithm is represented by the output weight matrix:

$$Q = \mathrm{diag}\{R_1, R_2, R_3\} \quad (8)$$

where $R_1$, $R_2$, and $R_3$ represent the radius of curvature with respect to the first axis direction, the second axis direction, and the third axis direction, respectively. In some examples, the weight matrix Q may correspond to one set of inc/mag measurement only. For all 12 inc/mag measurements, four of the Q matrices may be stacked diagonally in a single larger matrix. Alternatively, the feedforward algorithm in Equation 8 may be driven by data. For example, historical sensor measurement data of a past portion (e.g., a few hundred feet) of drilling may be used to model the relationship between radius of curvature and an uncertainty matrix.

Another factor that may be considered in the weight adaptation algorithm is anti-collision safety information. When a wellbore is proximate to other existing wellbores, there may be a risk of drilling into the other wellbores and causing a collision. In such scenarios, it is often desirable to utilize a tighter control along the direction in which a collision is most likely to occur.

Figure 4A:
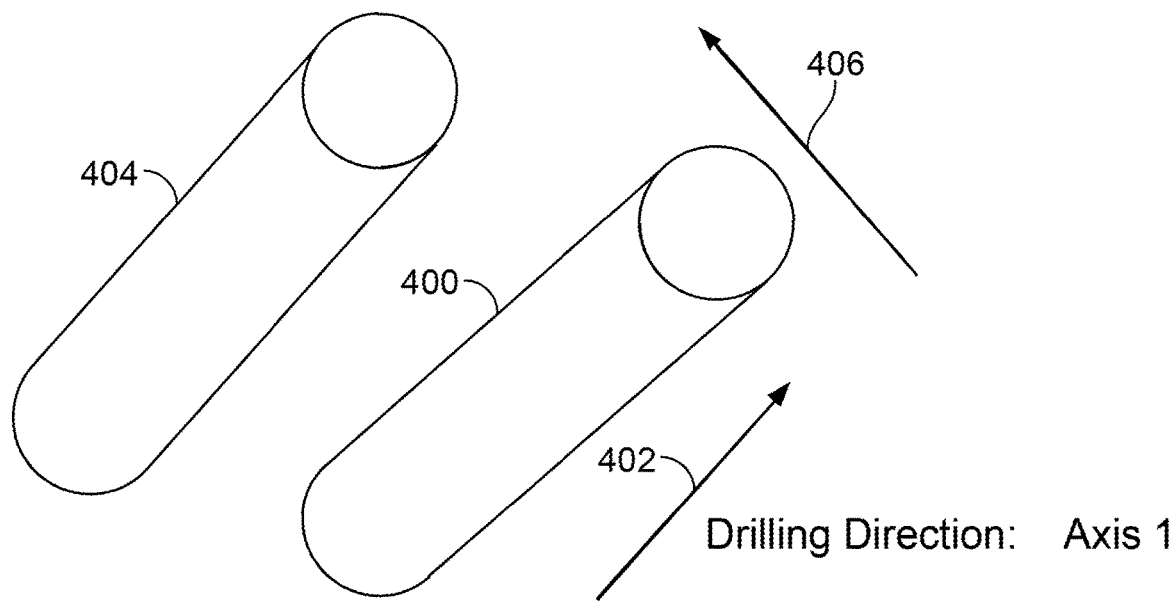
FIGS. 4A and 4B illustrate examples of determining an anti-collision direction for weighting factor adaptation.
Figure 4B:
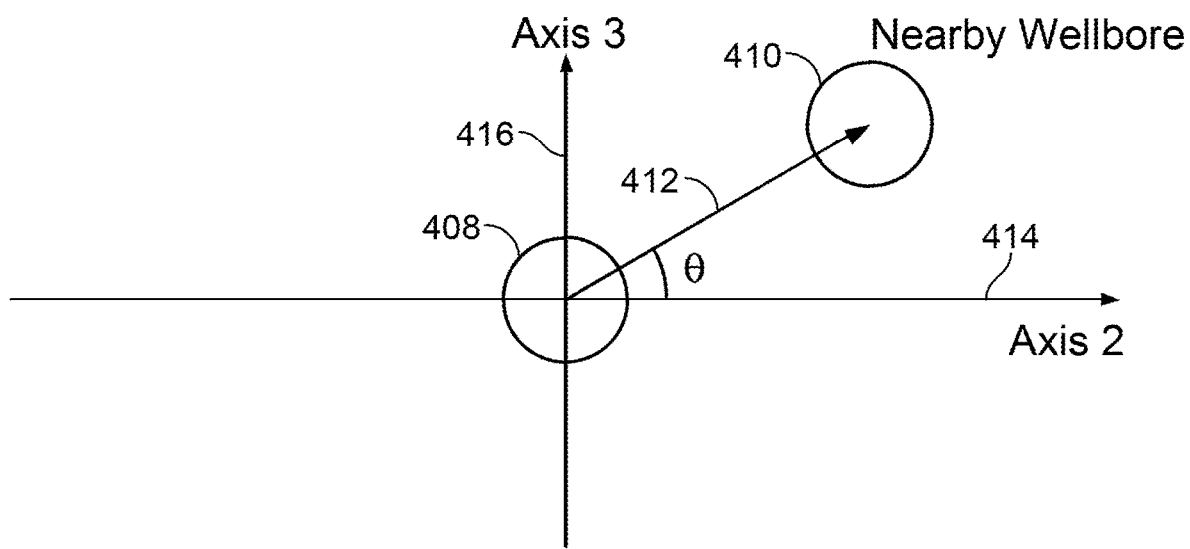

FIGS. 4A and 4B illustrate examples of determining an anti-collision direction for weighting factor adaptation. In FIG. 4A, the wellbore 400 has a trajectory along the drilling direction 402 corresponding to the first axis direction. A nearby wellbore 404 exists in a direction relative to the wellbore 400 indicated by directional indicator 406. In this example, the collision avoidance direction 406 is not completely along one of the principal axes. This is illustrated in FIG. 4B, which shows an example of a two-dimensional cross-sectional view of a collision-avoidance scenario. In FIG. 4B, the collision avoidance direction between wellbores 408 and 410, indicated by directional indicator 412, does not exist along either the second axis direction 414 nor the third axis direction 416. In such scenarios, the weight matrix Q may have off-diagonal elements that are non-zero.

The weight matrix may be designed in any suitable manner to reflect the collision avoidance information. As an illustrative example, the two-dimensional example in FIG. 4B may have a corresponding weight matrix Q expressed as:

$$Q = \begin{bmatrix} \cos\theta & -\sin\theta \\ \sin\theta & \cos\theta \end{bmatrix} \begin{bmatrix} W & 0 \\ 0 & 1 \end{bmatrix} \begin{bmatrix} \cos\theta & \sin\theta \\ -\sin\theta & \cos\theta \end{bmatrix} \quad (9)$$

where W is the weight along collision-avoidance direction 406 relative to the other (orthogonal) directions. The angle θ in the example of Equation 9 is the collision avoidance angle (e.g., in polar coordinates). The example in FIG. 4B is a simplified example for illustrative purposes, and the general principle can be extended to three dimensional space, for example, if there is another wellbore ahead in the drilling direction 402.

A weight synthesizer may be used to combine the three factors described above. In particular, weighting matrices Q determined in Equations 6, 8, and 9 may be synthesized into a single output weight matrix Q that may be applied to an objective function (e.g., the objective function in Equation 4). Any suitable synthesis technique may be used to combine the different matrices in Equations 6, 8, and 9 (and/or other matrices determined by other adaptation techniques), such as by taking a weighted combination. Similarly, the matrix S determined in Equation 7 may be combined with other weight matrices determined by other adaptation techniques. Other adaptation techniques may depend on any suitable measurement, prediction, or planning information relevant to the drilling operations.

Figure 5:
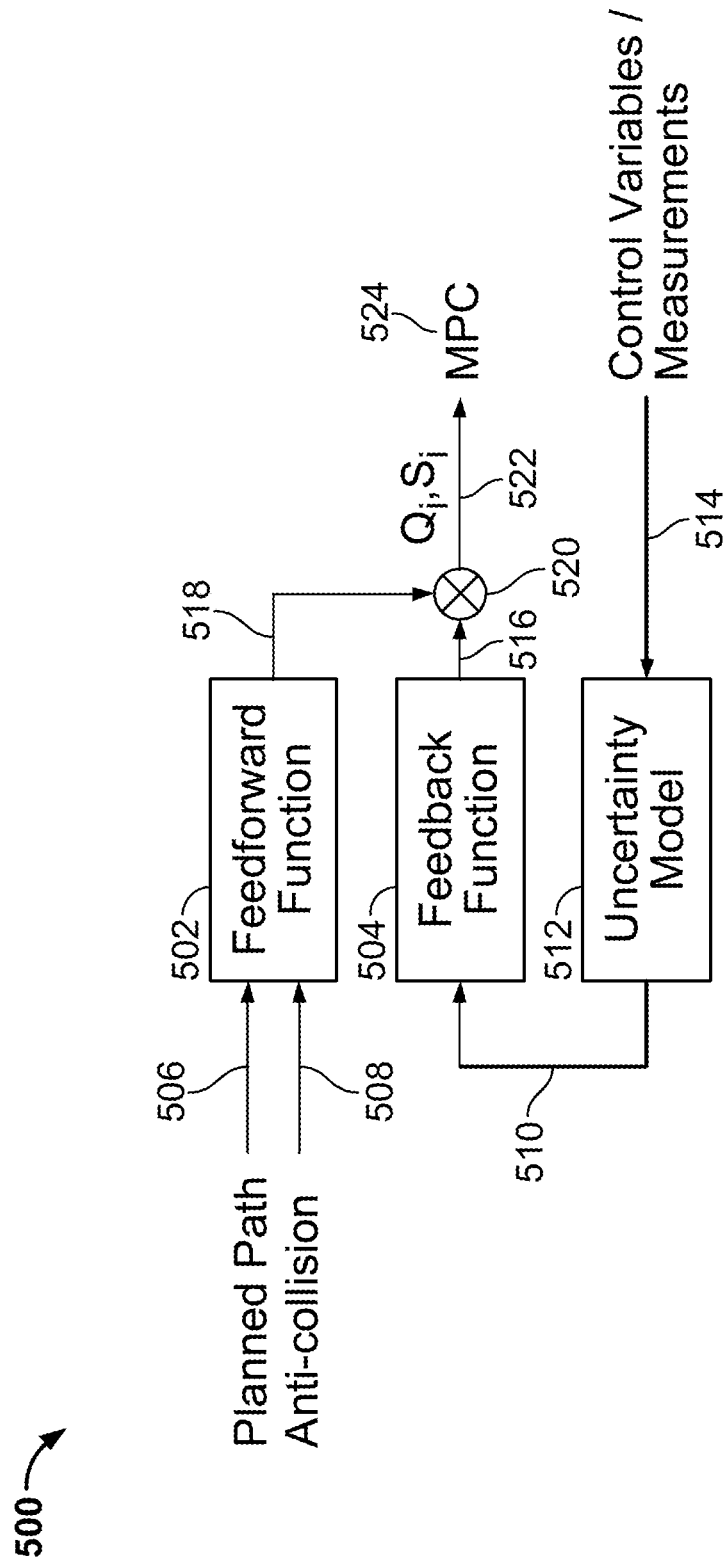
FIG. 5 is a flow diagram of an example of a process of weight adaptation and synthesis.

FIG. 5 illustrates a flow diagram of a process of weight adaptation and synthesis (e.g., in weight adaptation module 216 in FIG. 2). In the example of FIG. 5, the weight adaption process 500 uses both a feedforward function 502 and a feedback function 504. The feedforward function 502 may use any suitable wellbore planning information (e.g., planning information 220 in FIG. 2), examples of which include a planned wellbore path 506 and anti-collision information 508. The feedback function 504 may use any suitable feedback information 510 that is generated as a result of the drilling operation.

The feedback information 510 may include, for example, an uncertainty of the wellbore trajectory as generated by an uncertainty model 512. The uncertainty model 512 may determine the uncertainty of the wellbore trajectory based on drilling information 514, which may include measurements and/or control variables (e.g., sensor measurements 212 and/or control variables 204 in FIG. 2). For example, the uncertainty model 512 may determine a covariance matrix (e.g., the covariance matrix $\Sigma_y$ in Equations 6 and 7) by either computing covariance values between sensor measurements, or by generating predictions of uncertainty using a model of BHA dynamics.

The feedback function 504 uses the uncertainty measurements and/or predictions to generate feedback weight information 516. The feedback weight information 516 is synthesized, along with feedforward weight information 518 by the feedforward function 502, by the synthesizing operation 520 to generate weighting factors 522 (e.g., weight matrices Q and S in Equation 4). In some examples, the weight synthesizing process 500 outputs the weighting factors 522 over a future prediction horizon (e.g., the finite horizon T in Equation 4 or an infinite horizon for a steady-state solution). The weighting factors 522 are then input to the model-based predictive control 524 (e.g., as implemented by objective function solver in block 202 of FIG. 2) to generate BHA input controls.

After obtaining input/output data drilling information 514 that results from the drilling operation, the uncertainty of the wellbore trajectory is updated by uncertainty model 512, which is sent back to the feedback function 504 for updates to the feedback weight information 516. Meanwhile, the planned wellbore path may be updated and input to the feedforward function 502, which recalculates the feedforward weight information 518 based on the updated planning information.

Figure 6:
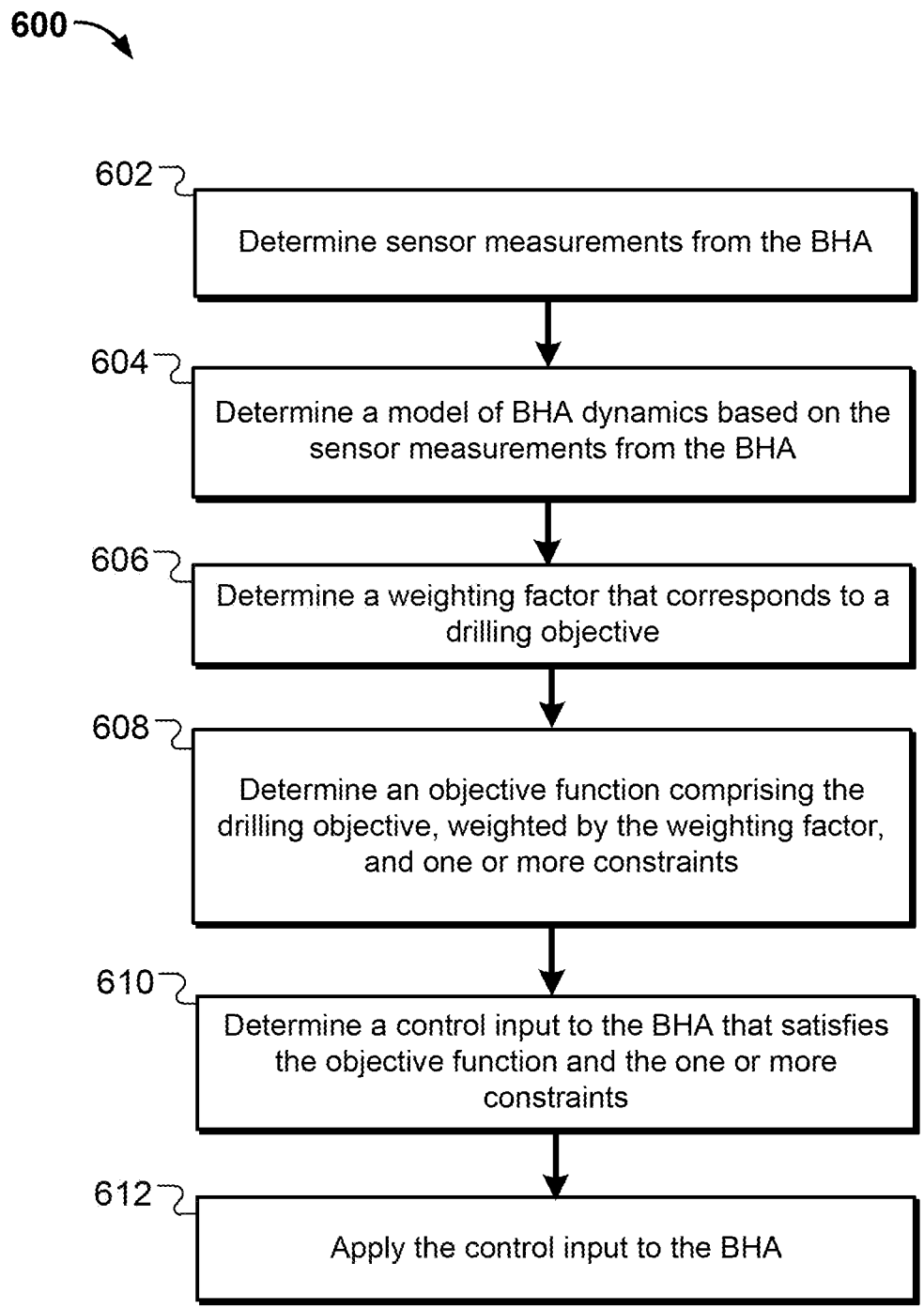
FIG. 6 is a flow chart of an example process for performing model-based predictive control of a BHA.

FIG. 6 is a flow chart of an example process 600 for performing model-based predictive control of a BHA. One or more steps of the example process of FIG. 6 may be performed by a wellbore controller (e.g., controller 132 in FIG. 1). In this example, the controller determines sensor measurements from the BHA (602). The controller then determines a model of BHA dynamics (e.g., the model in Equation 1) based on the sensor measurements from the BHA (604). The controller then determines a weighting factor (e.g., weighting factors in matrices Q and S in Equation 4) that corresponds to a drilling objective (606). The controller determines an objective function (e.g., the objective function in Equation 4) that includes the drilling objective, weighted by the weighting factor, and one or more constraints (e.g., the constraints in Equation 5) (608). The controller then determines a control input to the BHA that satisfies the objective function (e.g., optimizes the objective function in Equation 4) and the one or more constraints (610), and applies the control input to the BHA (612).

Figure 7:
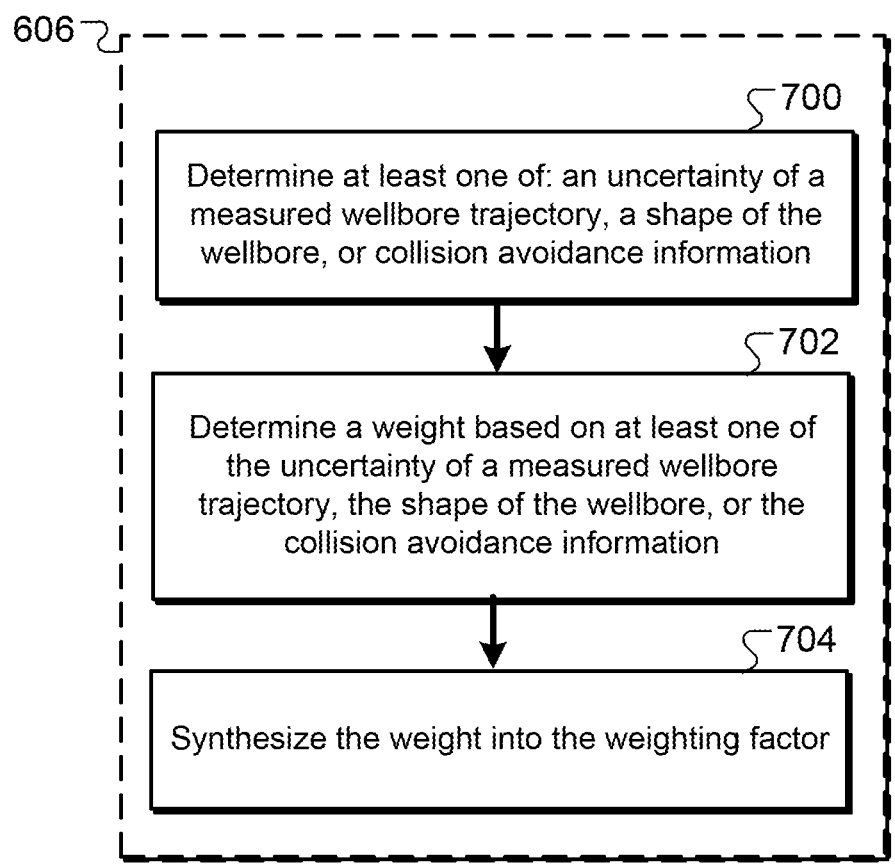
FIG. 7 is a flow chart of an example of further details of determining at least one weighting factor based on at least one of the model of BHA dynamics or the sensor measurements from the BHA.

FIG. 7 is a flow chart of an example of further details of determining a weighting factor (e.g., weighting factors in matrices Q and S in Equation 4) that corresponds to a drilling objective (e.g., step 606 in FIG. 6). In this example, the controller determines at least one of: an uncertainty of a measured wellbore trajectory, a shape of the wellbore, or collision avoidance information (700). The controller then determines a weight (e.g., the weights in weighting matrices Q and/or S in Equations 6 to 9) based on at least one of the uncertainty of a measured wellbore trajectory, the shape of the wellbore, or the collision avoidance information (702). The controller then synthesizes the weight into the weighting factor (e.g., weighting matrices determined in Equations 6, 8, and 9 may be synthesized into a single output weight matrix Q that may be applied to the objective function in Equation 4) (704).

Figure 8:
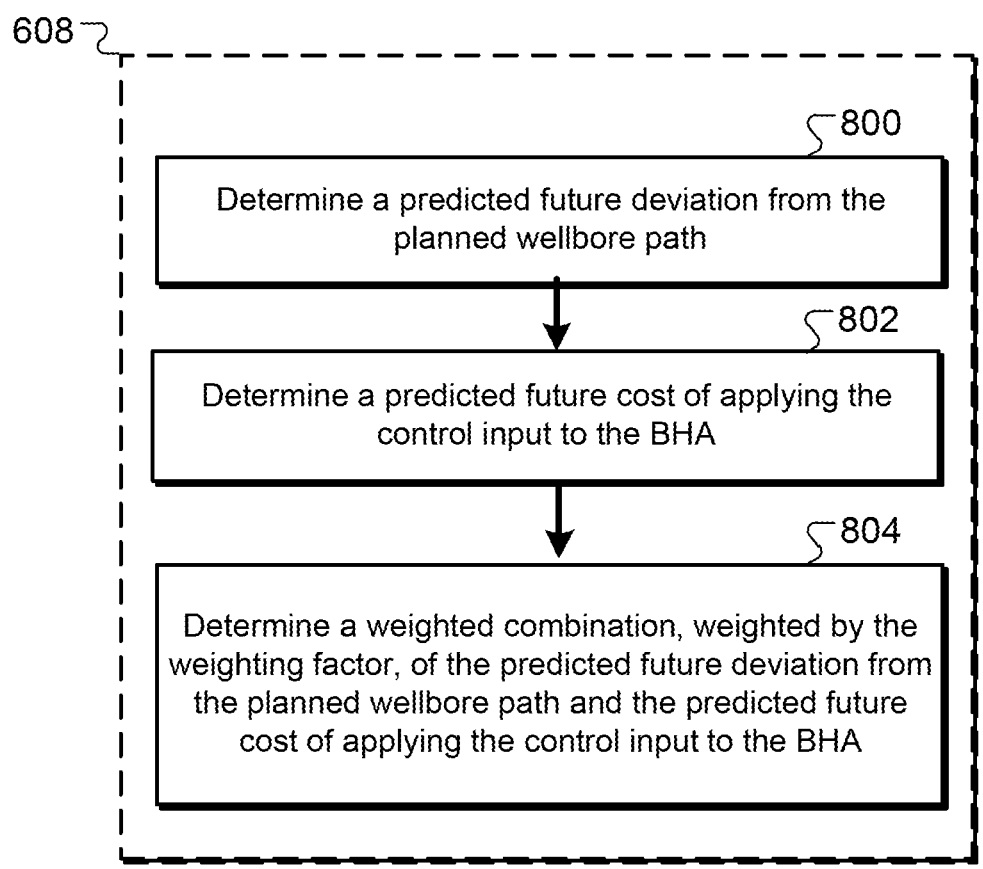
FIG. 8 is a flow chart of an example of further details of determining at least one weighting factor and determining an objective function weighted by the at least one weighting factor.

FIG. 8 is a flow chart of an example of further details of determining an objective function that includes the drilling objective, weighted by the weighting factor, and one or more constraints (e.g., step 608 in FIG. 6). In this example, the controller determines a predicted future deviation from the planned wellbore path (800). The controller also determines a predicted future cost of applying the control input to the BHA (802). The controller then determines a weighted combination, weighted by the weighting factor, of the predicted future deviation from the planned wellbore path and the predicted future cost of applying the control input to the BHA (804).

Figure 9:
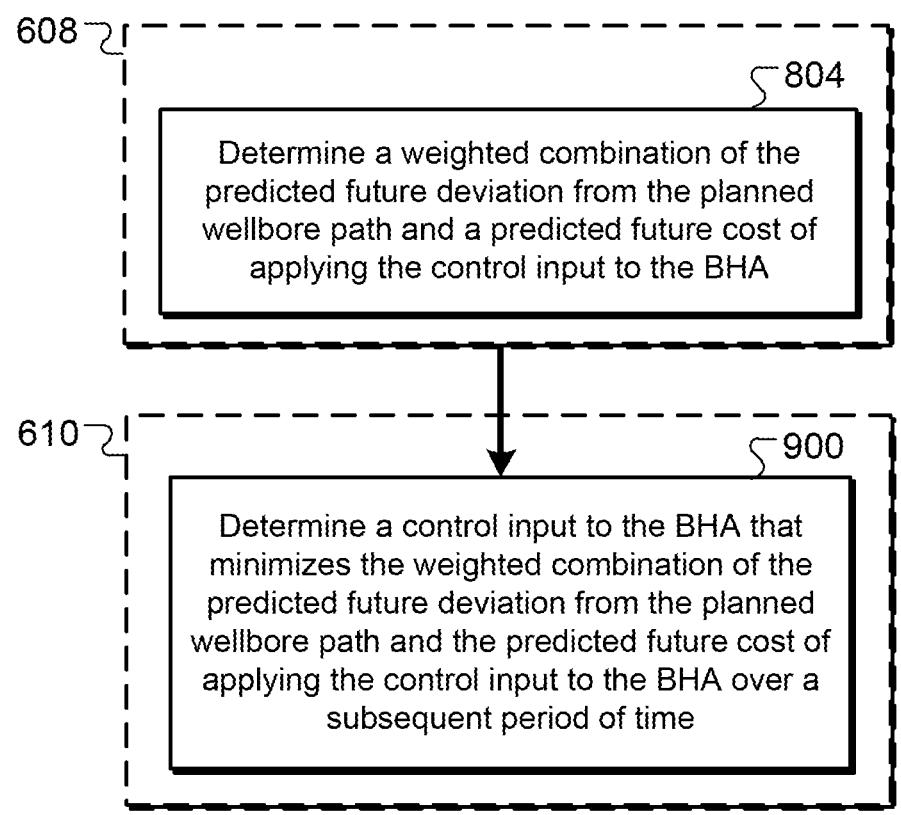
FIG. 9 is a flow chart of an example of further details of determining an objective function and determining a control input to the BHA that satisfies the objective function.

FIG. 9 is a flow chart of an example of further details of determining an objective function (e.g., the objective function in Equation 4) that includes the drilling objective, weighted by the weighting factor, and one or more constraints (e.g., step 608 in FIG. 6) and determining a control input to the BHA that satisfies the objective function and the one or more constraints (e.g., step 610 in FIG. 6). In this example, the controller determines a weighted combination of the predicted future deviation from the planned wellbore path and a predicted future cost of applying the control input to the BHA (e.g., step 804 in FIG. 8). The controller then determines a control input to the BHA that minimizes (e.g., as in Equation 4) the weighted combination of the predicted future deviation from the planned wellbore path and the predicted future cost of applying the control input to the BHA over a subsequent period of time (900).

Figure 10:
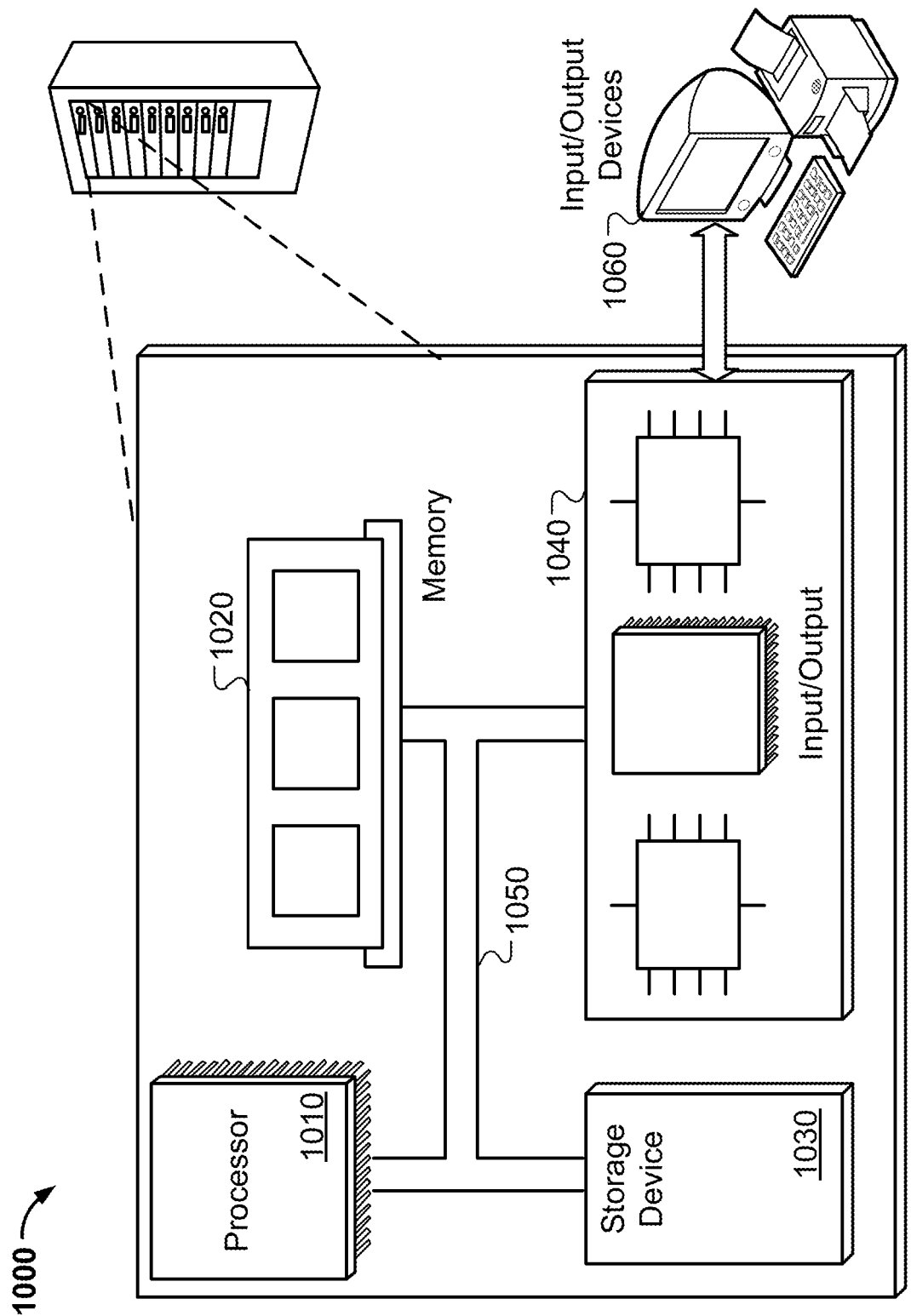
FIG. 10 is a block diagram of an example of a control system on which some examples may operate.

FIG. 10 is a block diagram of an example of a computer system 1000. For example, referring to FIG. 1, one or more parts of the controller 132 could be an example of the system 1000 described here, such as a computer system used by any of the users who access resources of the wellbore system 100. The system 1000 includes a processor 1010, a memory 1020, a storage device 1030, and an input/output device 1040. Each of the components 1010, 1020, 1030, and 1040 can be interconnected, for example, using a system bus 1050. The processor 1010 is capable of processing instructions for execution within the system 1000. In some implementations, the processor 1010 is a single-threaded processor. In some implementations, the processor 1010 is a multi-threaded processor. In some implementations, the processor 1010 is a quantum computer. The processor 1010 is capable of processing instructions stored in the memory 1020 or on the storage device 1030. The processor 1010 may execute operations such as determining a model of BHA dynamics, determining a weighting factor, determining a control input to the BHA, etc. (e.g., FIGS. 6 to 9).

The memory 1020 stores information within the system 1000. In some implementations, the memory 1020 is a computer-readable medium. In some implementations, the memory 1020 is a volatile memory unit. In some implementations, the memory 1020 is a non-volatile memory unit.

The storage device 1030 is capable of providing mass storage for the system 1000. In some implementations, the storage device 1030 is a computer-readable medium. In various different implementations, the storage device 1030 can include, for example, a hard disk device, an optical disk device, a solid-date drive, a flash drive, magnetic tape, or some other large capacity storage device. In some implementations, the storage device 1030 may be a cloud storage device, e.g., a logical storage device including multiple physical storage devices distributed on a network and accessed using a network. In some examples, the storage device may store long-term data, such as rock formation data or ROP design capabilities. The input/output device 1040 provides input/output operations for the system 1000. In some implementations, the input/output device 1040 can include one or more of a network interface devices, e.g., an Ethernet card, a serial communication device, e.g., an RS-232 port, and/or a wireless interface device, e.g., an 802.11 card, a 3G wireless modem, a 4G wireless modem, or a carrier pigeon interface. A network interface device allows the system 1000 to communicate, for example, transmit and receive instructions to and from the controller 132 in FIG. 1. In some implementations, the input/output device can include driver devices configured to receive input data and send output data to other input/output devices, e.g., keyboard, printer and display devices 1060. In some implementations, mobile computing devices, mobile communication devices, and other devices can be used.

A server (e.g., a server forming a portion of the controller 132 or the wellbore system 100 shown in FIG. 1) can be realized by instructions that upon execution cause one or more processing devices to carry out the processes and functions described above, for example, such as determining weighting factors, determining a control input to the BHA that satisfies an objective function, etc. (e.g., FIGS. 6 to 9). Such instructions can include, for example, interpreted instructions such as script instructions, or executable code, or other instructions stored in a computer readable medium. Different components of a wellbore system 100 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made. For example, additional aspects of processes 600 may include more steps or fewer steps than those illustrated in FIGS. 6 to 9. Further, the steps illustrated in FIGS. 6 to 9 may be performed in different successions than that shown in the figures. Moreover, although the concepts have been described in the context of a wellbore drilling system, the concepts could be applied to other processes as well. For example, in connection with medical endoscopic examination or other applications where an instrument is inserted and controlled inside of an unknown environment. Accordingly, other implementations are within the scope of the following claims.

What is claimed is:

1. A computer-implemented method of controlling a bottom hole assembly (BHA) to follow a planned wellbore path, the method comprising:
   determining sensor measurements from the BHA;
   determining a model of BHA dynamics based on the sensor measurements from the BHA;
   determining weighting factors that correspond to different drilling objectives associated with a drilling operation;
   determining an objective function comprising the different drilling objectives, weighted by the weighting factors, and one or more constraints, wherein:
      the objective function includes future system states of the BHA,
      determining the objective function includes determining a predicted future deviation from the planned wellbore path, and
      the weighting factors are automatically adapted during the drilling operation to selectively emphasize the different drilling objectives in the objective function in response to changing conditions in the wellbore, wherein the changing conditions in the wellbore comprise different layers of rock and differently-shaped portions of the planned wellbore path;
   determining a control input to the BHA that satisfies the objective function and the one or more constraints; and
   applying the control input to the BHA.

2. The computer-implemented method of claim 1, wherein determining the weighting factors that correspond to the different drilling objectives further comprises:
   determining a weighting factor based on at least one of the model of BHA dynamics or the sensor measurements from the BHA.

3. The computer-implemented method of claim 2, wherein determining the weighting factor based on at least one of the model of BHA dynamics or the sensor measurements from the BHA comprises:
   determining at least one of an uncertainty of a measured wellbore trajectory, a shape of the wellbore, or collision avoidance information;
   determining a weight based on at least one of the uncertainty of a measured wellbore trajectory, the shape of the wellbore, or the collision avoidance information; and
   synthesizing the weight into the weighting factor.

4. The computer-implemented method of claim 3, wherein determining the uncertainty of a measured wellbore trajectory comprises determining covariance values between a plurality of azimuth values and inclination values for the wellbore trajectory.

5. The computer-implemented method of claim 4, wherein determining the weighting factors that correspond to the different drilling objectives comprises tightening a constraint on the control input to the BHA in a direction in which the uncertainty of the measured wellbore trajectory has increased from a previous measurement time.

6. The computer-implemented method of claim 5, wherein tightening a constraint on the control input to the BHA comprises determining an increased value of a weighting factor associated with the control input to the BHA.

7. The computer-implemented method of claim 4, wherein the different drilling objectives comprise a predicted deviation from the planned wellbore path, and determining the weighting factors that correspond to the different drilling objectives comprises loosening a constraint on the predicted deviation from the planned wellbore path in a direction in which the uncertainty of the measured wellbore trajectory has increased from a previous measurement time.

8. The computer-implemented method of claim 7, wherein loosening a constraint on the predicted deviation from the planned wellbore path comprises determining a reduced value of a weighting factor associated with the predicted deviation from the planned wellbore path.

9. The computer-implemented method of claim 4, wherein determining covariance values between a plurality of azimuth values and inclination values for the wellbore trajectory further comprises:
   determining a plurality of azimuth measurements and inclination measurements received from sensors of the BHA; and
   determining covariance values between the plurality of azimuth measurements and inclination measurements received from the sensors of the BHA.

10. The computer-implemented method of claim 9, wherein determining covariance values between the plurality of azimuth measurements and inclination measurements further comprises determining a cross-correlation between uncertainty values in two different directions from the wellbore trajectory.

11. The computer-implemented method of claim 4, wherein determining covariance values between a plurality of azimuth values and inclination values for the wellbore trajectory further comprises:
determining a plurality of azimuth predictions and inclination predictions based on the model of BHA dynamics; and
determining covariance values between the plurality of azimuth predictions and inclination predictions based on the model of BHA dynamics.

12. The computer-implemented method of claim 3, wherein determining a shape of the wellbore comprises determining a radius of curvature for a subsequent portion of the planned wellbore path.

13. The computer-implemented method of claim 12, wherein the drilling objectives comprise a predicted deviation from the planned wellbore path, and determining a weighting factor comprises reducing a constraint on the predicted deviation from the planned wellbore path in a direction in which the radius of curvature for the subsequent portion of the planned wellbore path has decreased from a previous measurement time.

14. The computer-implemented method of claim 3, wherein determining collision avoidance information comprises determining a direction in which a collision with another wellbore is most likely to occur.

15. The computer-implemented method of claim 14, wherein the drilling objectives comprise a predicted deviation from the planned wellbore path, and determining a weighting factor comprises tightening a constraint on the predicted deviation from the planned wellbore path in the direction in which a collision with another wellbore is most likely to occur.

16. The computer-implemented method of claim 1, wherein determining an objective function comprises:
determining a predicted future cost of applying the control input to the BHA; and
determining a weighted combination, weighted by the weighting factors, of the predicted future deviation from the planned wellbore path and the predicted future cost of applying the control input to the BHA.

17. The computer-implemented method of claim 16, wherein determining the weighting factors comprises:
determining a first weighting factor for the predicted future deviation from the planned wellbore path; and
determining a second weighting factor for the predicted future cost of applying the control input to the BHA.

18. The computer-implemented method of claim 16, wherein determining the control input to the BHA that satisfies the objective function comprises determining a control input to the BHA that minimizes the weighted combination of the predicted future deviation from the planned wellbore path and the predicted future cost of applying the control input to the BHA over a subsequent period of time.

19. The computer-implemented method of claim 16, wherein the predicted future cost of applying the control input to the BHA comprises a predicted energy consumption for the BHA.

20. The computer-implemented method of claim 1, further comprising:
determining a candidate control input to the BHA;
determining a predicted wellbore trajectory, based on the candidate control input to the BHA and the model of BHA dynamics; and
determining a predicted future deviation from the planned wellbore path based on a deviation between the predicted wellbore trajectory and the planned wellbore path.

21. The computer-implemented method of claim 1, wherein determining the control input to the BHA comprises determining at least one of a first bend angle control, a second bend angle control, a first packer control, or a second packer control.

22. The computer-implemented method of claim 1, further comprising:
determining updated sensor measurements from the BHA;
determining an updated model of BHA dynamics based on the updated sensor measurements from the BHA;
determining updated weighting factors and an updated objective function based on at least one of the updated model of BHA dynamics or the updated sensor measurements from the BHA; and
automatically adapting the control input to the BHA that satisfies the updated objective function based on the updated weighting factors.

23. A system comprising:
a first component located at or near a terranean surface;
a bottom hole assembly (BHA) at least partially disposed within a wellbore at or near a subterranean zone, the BHA associated with at least one sensor; and
a controller communicably coupled to the first component and the BHA, the controller operable to perform operations comprising:
determining sensor measurements from the BHA;
determining a model of BHA dynamics based on the sensor measurements from the BHA;
determining weighting factors that correspond to different drilling objectives associated with a drilling operation;
determining an objective function comprising the different drilling objectives, weighted by the weighting factors, and one or more constraints, wherein:
the objective function includes future system states of the BHA,
determining the objective function includes determining a predicted future deviation from a planned path of the wellbore, and
the weighting factors are automatically adapted during the drilling operation to selectively emphasize the different drilling objectives in the objective function in response to changing conditions in the wellbore, wherein the changing conditions in the wellbore comprise different layers of rock and differently-shaped portions of the planned wellbore path;
determining a control input to the BHA that satisfies the objective function and the one or more constraints; and
applying the control input to the BHA.

24. A non-transitory computer-readable storage medium encoded with at least one computer program comprising instructions that, when executed, operate to cause at least one processor to perform operations for controlling a bottom hole assembly (BHA) to follow a planned wellbore path, the operations comprising:
determining sensor measurements from the BHA;
determining a model of BHA dynamics based on the sensor measurements from the BHA;
determining weighting factors that correspond to different drilling objectives associated with a drilling operation;

determining an objective function comprising the different drilling objectives, weighted by the weighting factors, and one or more constraints, wherein;
the objective function includes future system states of the BHA,
determining the objective function includes determining a predicted future deviation from the planned wellbore path, and
the weighting factors are automatically adapted during the drilling operation to selectively emphasize the different drilling objectives in the objective function in response to changing conditions in the wellbore, wherein the changing conditions in the wellbore comprise different layers of rock and differently-shaped portions of the planned wellbore path;
determining a control input to the BHA that satisfies the objective function and the one or more constraints; and
applying the control input to the BHA.

* * * * *

UNITED STATES PATENT AND TRADEMARK OFFICE
CERTIFICATE OF CORRECTION

PATENT NO. : 10,794,168 B2
APPLICATION NO. : 15/035693
DATED : October 6, 2020
INVENTOR(S) : Jason D. Dykstra and Zhijie Sun Page 1 of 1

It is certified that error appears in the above-identified patent and that said Letters Patent is hereby corrected as shown below:

In the Claims

In Claim 8, Column 24, Line 49, after --path comprises-- delete "detennining" and insert --determining--

Signed and Sealed this
Twelfth Day of January, 2021

Andrei Iancu
*Director of the United States Patent and Trademark Office*